US009307069B2

(12) United States Patent
Tak et al.

(10) Patent No.: US 9,307,069 B2
(45) Date of Patent: *Apr. 5, 2016

(54) HOME APPLIANCE, MOBILE TERMINAL, AND OPERATION METHOD THEREOF

(71) Applicant: LG ELECTRONICS INC., Seoul (KR)

(72) Inventors: Chulgon Tak, Seoul (KR); Jeonghan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

This patent is subject to a terminal disclaimer.

(21) Appl. No.: 14/093,106

(22) Filed: Nov. 29, 2013

(65) Prior Publication Data
US 2014/0148147 A1 May 29, 2014

(30) Foreign Application Priority Data

Nov. 29, 2012 (KR) .......................... 10-2012-0137278

(51) Int. Cl.
*H04M 3/00* (2006.01)
*H04M 1/725* (2006.01)

(52) U.S. Cl.
CPC ................................ *H04M 1/72533* (2013.01)

(58) Field of Classification Search
CPC ..... H04W 8/245; H04W 88/02; H04W 84/18; H04W 72/005; H04L 29/08108; H04L 2012/5607; H04M 1/72533; H04M 1/72519; H04M 1/0214; H04M 11/002; G07C 7/00; B60R 16/0315
USPC ............. 455/414.1, 418, 419, 420, 421, 90.1, 455/550.1, 41.2, 41.3; 370/310.2, 312; 340/3.1, 679; 379/106.01
See application file for complete search history.

(56) References Cited

U.S. PATENT DOCUMENTS

| 6,119,088 A * | 9/2000 | Ciluffo .......................... 704/275 |
| 8,629,753 B2 * | 1/2014 | Yum et al. ...................... 340/3.1 |
| 2002/0170303 A1 * | 11/2002 | Clark et al. ...................... 62/206 |
| 2004/0016243 A1 * | 1/2004 | Song et al. ...................... 62/132 |
| 2009/0265551 A1 * | 10/2009 | Tripunitara et al. ........... 713/168 |

FOREIGN PATENT DOCUMENTS

| CN | 101127823 A | 2/2008 |
| CN | 101330458 A | 12/2008 |
| CN | 101742075 A | 6/2010 |
| CN | 101951368 A | 1/2011 |

OTHER PUBLICATIONS

English Translation of CN 101951368A (provided by examiner and used in the NFOA).*

* cited by examiner

*Primary Examiner* — Steve D Agosta
(74) *Attorney, Agent, or Firm* — Dentons US LLP

(57) ABSTRACT

A home appliance, a mobile terminal, and an operation method thereof are disclosed. The home appliance includes a communication unit to receive a remote control signal from a mobile terminal, an input unit to receive a user input signal from a local key, and a controller to assign priority to the user input signal according to the input of the local key and to control an operation of the home appliance corresponding to the user input signal when a time difference between input of the local key and reception of the remote control signal is within a predetermined time. When a plurality of control rights is requested, the home appliance may assign priority to any one of the requested control rights.

10 Claims, 54 Drawing Sheets

200a

200b

200c

200d

T = t₁

T = t₂

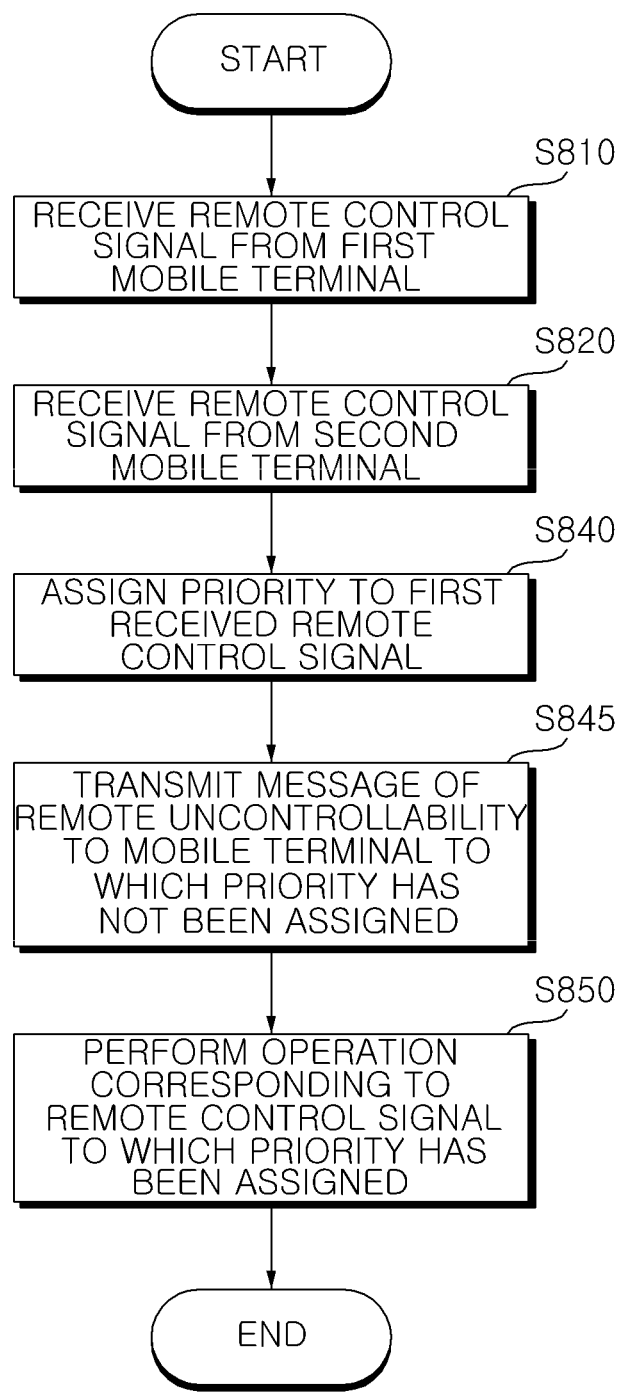

T = Ty

HOME APPLIANCE, MOBILE TERMINAL, AND OPERATION METHOD THEREOF

CROSS-REFERENCE TO RELATED APPLICATION

This application claims the priority benefit of Korean Patent Application No. 10-2012-0137278. filed on Nov. 29, 2012. in the Korean Intellectual Property Office, the disclosure of which is incorporated herein by reference.

BACKGROUND

1. Field

The present invention relates to a home appliance, a mobile terminal, and an operation method thereof and, more particularly, to a home appliance that is capable of, in a case in which a plurality of control rights is requested, assigning priority to any one of the requested control rights, a mobile terminal, and an operation method thereof.

2. Description of the Related Art

A refrigerator, which is a home appliance, stores food for users. A laundry treatment machine, which is another home appliance, treats laundry. An air conditioner, which is another home appliance, regulates room temperature. And a cooking device, which is yet another home appliance, cooks food.

With development of various communication modes, research has been conducted into various methods of improving user convenience through communication with the home appliance.

SUMMARY

It is an object of the present invention to provide a home appliance that is capable of, when a plurality of control rights is requested, assigning priority to any one of the requested control rights and an operation method thereof.

It is another object of the present invention to provide a home appliance that is capable of providing different remote control rights to a mobile terminal located in a house and a mobile terminal located outside the house, and an operation method thereof.

In accordance with one aspect of the present invention, the above and other objects can be accomplished by the provision of a home appliance including a communication unit to receive a remote control signal from a mobile terminal, an input unit to receive a user input signal from a local key, and a controller to assign priority to the user input signal according to the input of the local key and to control an operation of the home appliance corresponding to the user input signal when a time difference between input of the local key and reception of the remote control signal is within a predetermined time.

In accordance with another aspect of the present invention, there is provided an operation method of a home appliance including receiving a remote control signal from a mobile terminal, receiving a user input signal from a local key, when a time difference between input of the local key and reception of the remote control signal is within a predetermined time, assigning priority to the user input signal according to input of the local key, and performing an operation of the home appliance corresponding to the user input signal.

In accordance with another aspect of the present invention, there is provided a mobile terminal including a display unit, a wireless communication unit to transmit a remote access signal to a home appliance and to receive a remotely controllable item and a remotely uncontrollable item from the home appliance when the mobile terminal is located outside an internal network, and a controller to control a remote control screen including the remotely controllable item and the remotely uncontrollable item to be displayed.

In accordance with a further aspect of the present invention, there is provided a home appliance including a drive unit, a communication unit to receive a remote access signal from a mobile terminal, and a controller to determine whether the mobile terminal is located outside an internal network and to, upon determining that the mobile terminal is located outside the internal network, distinguishably notify the mobile terminal of a remotely controllable item and a remotely uncontrollable item.

BRIEF DESCRIPTION OF THE DRAWINGS

The above and other objects, features, and other advantages of the present invention will be more clearly understood from the following detailed description taken in conjunction with the accompanying drawings, in which:

FIG. 8 is a flowchart showing an operation method of a home appliance according to another embodiment of the present invention;

DETAILED DESCRIPTION

Reference will now be made in detail to the preferred embodiments of the present invention, examples of which are illustrated in the accompanying drawings.

The terms "module" and "unit," when attached to the names of components, are used herein to aid in understanding of the components and thus should not be considered as having specific meanings or roles. Accordingly, the terms "module" and "unit" may be used interchangeably.

Figure 1:
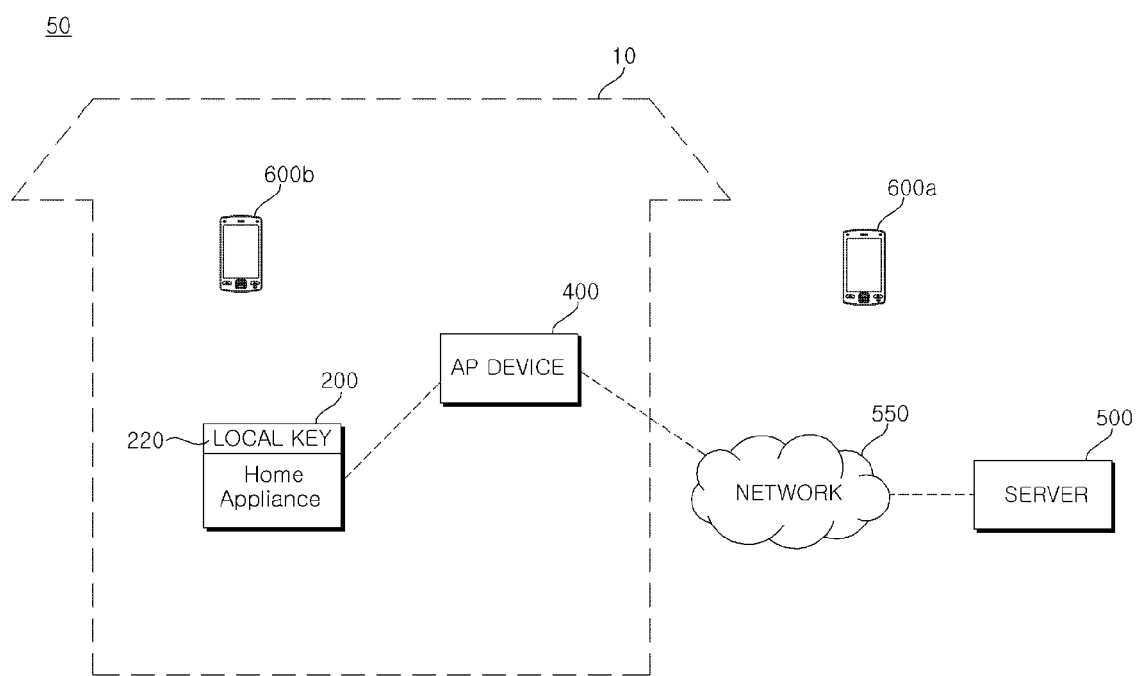
FIG. 1 is shows an example of a configuration of a communication system according to an embodiment of the present invention.

FIG. 1 is shows an example of a configuration of a communication system according to an embodiment of the present invention.

Referring to FIG. 1, a communication system 50 according to an embodiment of the present invention may include a home appliance 200, a mobile terminal 600a or 600b. an access point (AP) device 400, and a server 500.

Home appliance 200, AP device 400, and an indoor mobile terminal 600b of communication system 50 may constitute an internal network 10. Home appliance 200 may perform wireless data communication with an outdoor mobile terminal 600a via an external network 550.

Home appliance 200 may be an electric device for home use. For example, home appliance 200 may be a refrigerator 200a (see FIG. 2A), a washing machine 200b (see FIG. 2B), an air conditioner 200c (see FIG. 2C), or a cooking device 200d (see FIG. 2D). Additionally, the home appliance 200 may be a cleaner or a television (TV).

Home appliance 200 may include a local key 220. Home appliance 200 may operate according to a user input signal through local key 200. Alternatively, home appliance 200 may operate according to a remote control signal received through wireless data communication with mobile terminals 600a and 600b.

To this end, home appliance 200 may include a communication unit 222 (see FIG. 3) to transmit or receive data to or from AP device 400 in a wireless fashion. As a result, home appliance 200 may exchange data with mobile terminals 600a or 600b via AP device 400 in a wireless fashion.

On the other hand, according to one embodiment of the present invention, when a plurality of control rights is requested, home appliance 200 may assign priority to any one of the requested control rights.

For example, when a time difference between the input of the local key and the reception of the remote control signal is within a predetermined time, home appliance 200 may assign priority to the user input signal according to the input of the local key and then operate. Home appliance 200 may assign priority to the input of the local key with the result that a local key user may have higher convenience in use than a remote control user.

In another example, when the input of the local key is performed prior to the reception of the remote control signal, home appliance 200 may assign priority to the user input signal according to the input of the local key and then operate.

In another example, when the remote control signal is received first and the local key is input later and a time difference between the input of the local key and the reception of the remote control signal exceeds a predetermined time, home appliance 200 may assign priority to the remote control signal and then operate.

In a further example, when a plurality of remote control signals is received from a plurality of mobile terminals, home appliance 200 may assign priority to the first one of the received remote control signals and then operate.

In another embodiment of the present invention, on the other hand, when the remote control signal is received from mobile terminal 600b located in internal network 10 and when the remote control signal is received from mobile terminal 600a accessed via external network 550, not via internal network 10, home appliance 200 may differently set remotely controllable items.

For example, when the mobile terminal 600a is located outside internal network 10, home appliance 200 may determine that mobile terminal 600a is located outside internal network 10 based on an access signal from mobile terminal 600a. specifically network information.

In this case, home appliance 200 may distinguishably notify mobile terminal 600a of remotely controllable items and remotely uncontrollable items. As a result, mobile terminal 600a may distinguishably display the remotely controllable items and the remotely uncontrollable items. Consequently, different remote control rights may be provided to the indoor mobile terminal and the outdoor mobile terminal.

In another example, when mobile terminal 600b is located in internal network 10, home appliance 200 may determine that mobile terminal 600a is located in internal network 10 based on an access signal from mobile terminal 600a. specifically network information.

In this case, home appliance 200 may notify mobile terminal 600a of all remotely controllable items. As a result, mobile terminal 600b may display a remote control screen including only the remotely controllable items. Consequently, different remote control rights may be provided to the indoor mobile terminal and the outdoor mobile terminal.

Home appliance 200 may access server 500 via AP device 400 and external network 550. Upon access to server 500, home appliance 200 may perform product registration. Additionally, home appliance 200 may download the latest driving course, the latest firmware, programs, applications, etc.

Meanwhile, AP device 400 may assign a wireless channel based on a first communication mode to the electric devices in internal network 10 and perform wireless data communication through the assigned channel. The first communication mode may be a Wi-Fi communication mode.

Meanwhile, mobile terminal(s) 600a/600b may perform wireless communication with the home appliance via AP device 400. Specifically, mobile terminal(s) 600a/600b may transmit a remote control signal to remotely control home appliance 200. In order to monitor or remotely control home appliance 200, on the other hand, state information, such as monitoring information, of home appliance 200 may be transmitted to mobile terminal(s) 600a/600b.

Meanwhile, mobile terminal 600a or 600b may be a mobile phone, a smartphone, a laptop computer, a tablet PC, etc.

When mobile terminal 600a is located in the internal network, on the other hand, wireless data communication may be directly performed between mobile terminal 600a and home appliance 200 without AP device 400.

FIGS. 2A to 2D illustrate various examples of home appliances.

Figure 2A:
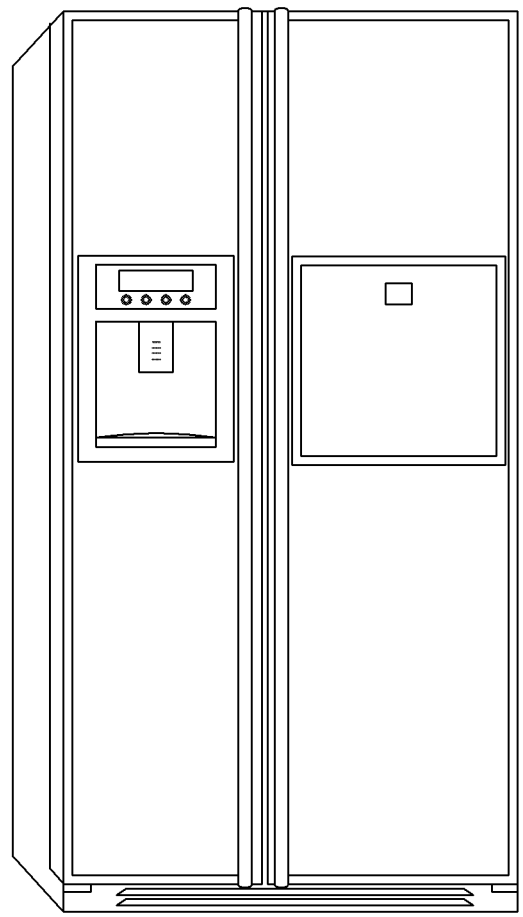
FIGS. 2A to 2D illustrate various examples of home appliances.
Figure 2B:
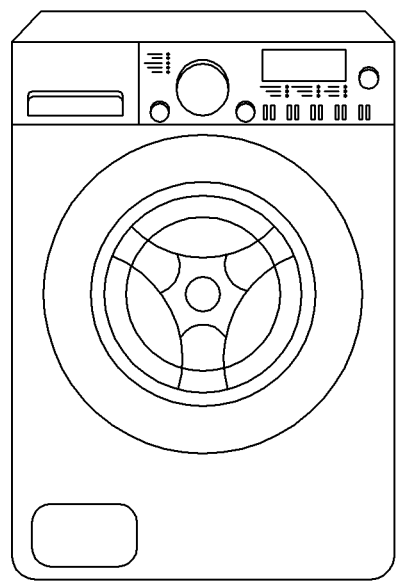
Figure 2C:
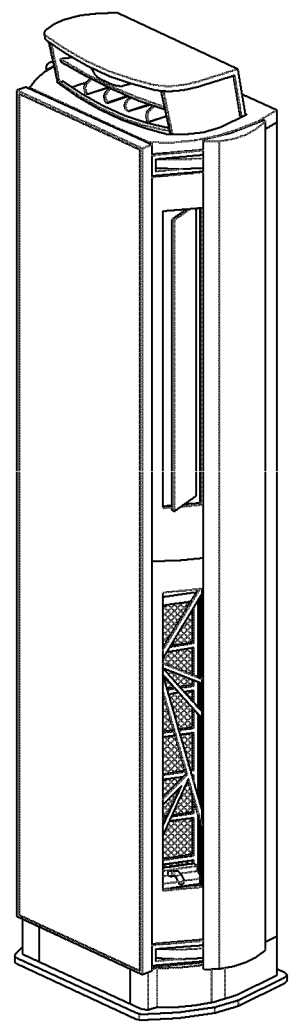
Figure 2D:
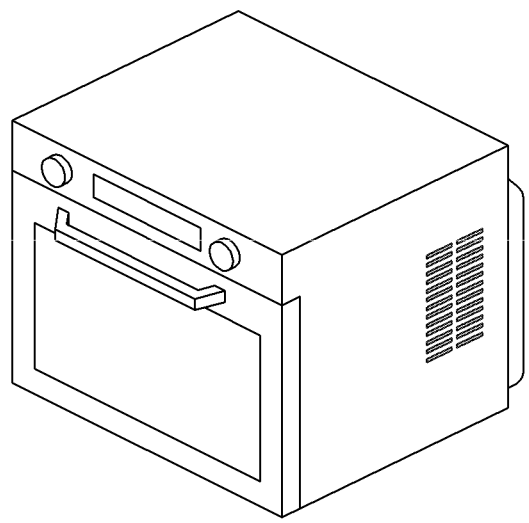

FIG. 2A illustrates a refrigerator 200a. FIG. 2B illustrates a washing machine 200b. FIG. 2C illustrates an air conditioner 200c. and FIG. 2D illustrates a cooking device 200d. In addition, the home appliance may be a cleaner.

Figure 3:
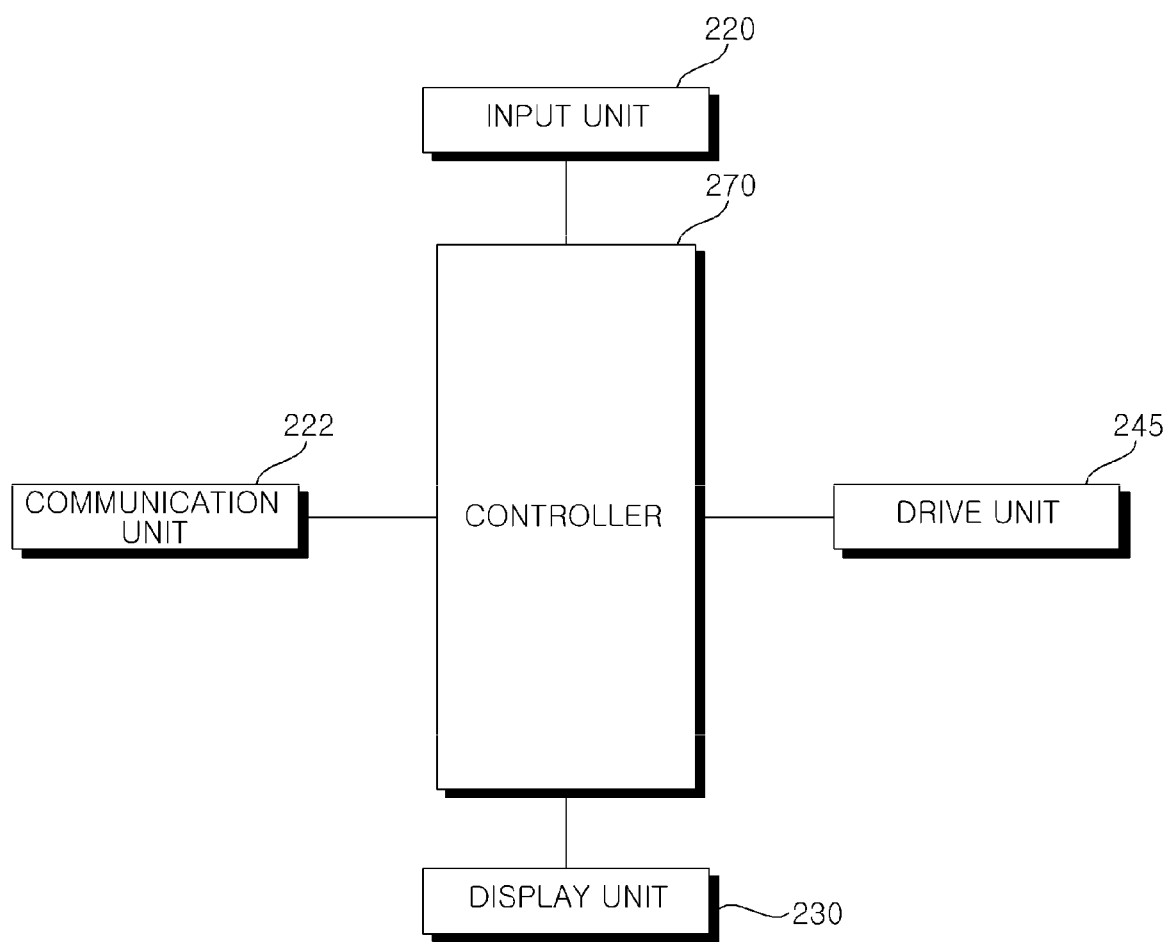
FIG. 3 is an internal block diagram schematically showing a home appliance of FIG. 1.

FIG. 3 is an internal block diagram schematically showing the home appliance of FIG. 1.

Referring to FIG. 3, home appliance 200 may include an input unit 220 to allow a user input, a display unit 230 to display an operation state of the home appliance, a communication unit 222 to communicate with an external device, a drive unit 245 to drive the home appliance, and a controller 270 to perform internal control.

Input unit 200 may include a local key to allow a user input as previously described with reference to FIG. 1.

Drive unit 245 may include different drive units according to the home appliance used.

For example, when the home appliance is a refrigerator, drive unit 245 may include a refrigerating compartment drive unit to drive a refrigerating compartment fan configured to supply cooled air into a refrigerating compartment, a freezing compartment drive unit to drive a freezing compartment fan configured to supply cooled air into a freezing compartment, and a compressor drive unit to drive a compressor configured to compress a refrigerant.

In another example, when the home appliance is a washing machine, drive unit 245 may include a drive unit to drive a drum or a tub.

In another example, when the home appliance is an air conditioner, drive unit 245 may include a compressor drive unit to drive a compressor mounted in an outdoor unit, an outdoor unit fan drive unit to drive an outdoor unit fan configured to perform heat exchange, and an indoor unit fan drive unit to drive an indoor unit fan configured to perform heat exchange.

In another example, when the home appliance is a cooking device, drive unit 245 may include a microwave drive unit to output microwaves into a cavity. In a further example, when the home appliance is a cleaner, drive unit 245 may include a fan motor drive unit to drive a fan motor configured to suction air.

Meanwhile, communication unit 222 may include a wireless communication module (not shown) to perform at least wireless communication.

Communication unit 222 may include a first communication module (not shown) to perform wireless communication with AP device 400 (see FIG. 1). The first communication module may perform Wi-Fi communication. Communication unit 222 may perform wireless data communication with mobile terminal 600a or 600b (see FIG. 1) via AP device 400. For example, communication unit 222 may receive a remote control signal from mobile terminal 600a or 600b and transmit the received remote control signal to controller 270.

On the other hand, communication unit 222 may receive power information from a power information transmission device (not shown). To this end, communication unit 222 may further include a second communication module (not shown) in addition to the first communication module.

Communication unit 222 may be provided in the home appliance. Alternatively, communication unit 222 may be fixed to a case of home appliance 200 in a state in which communication unit 222 is connected to an internal circuit of the home appliance in a wired fashion.

Additionally, although not shown, home appliance 200 may further include a memory (not shown) to store data.

Figure 4:
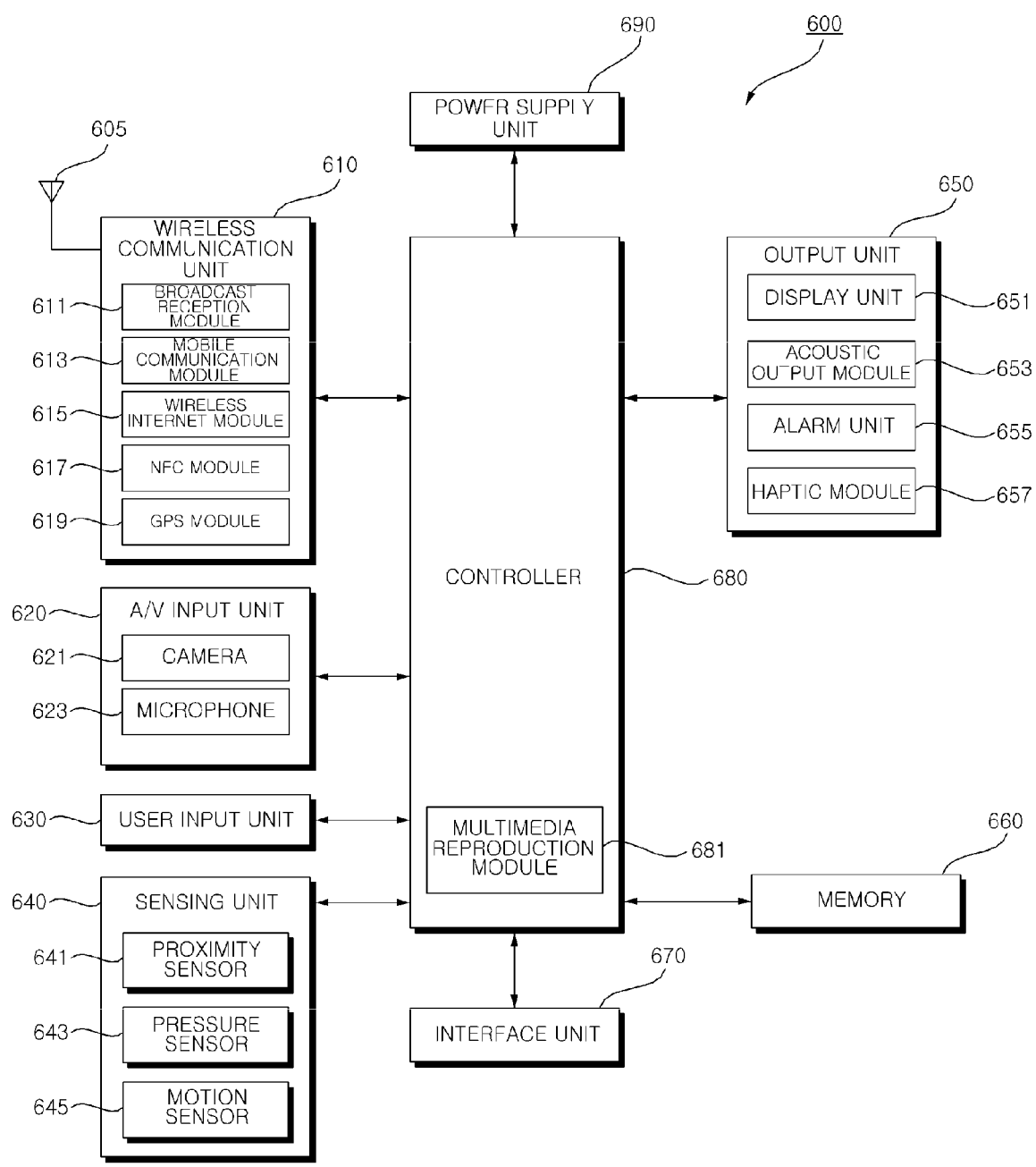
FIG. 4 is an internal block diagram showing a mobile terminal of FIG. 1.

FIG. 4 is an internal block diagram showing the mobile terminal of FIG. 1.

Referring to FIG. 4, mobile terminal 600 may include a wireless communication unit 610, an audio/video (A/V) input unit 620, a user input unit 630, a sensing unit 640, an output unit 650, a memory 660, an interface unit 670, a controller 680, and a power supply unit 690.

Wireless communication unit 610 may include a broadcast reception module 611, a mobile communication module 613, a wireless Internet module 615, a near field communication (NFC) module 617, and a global positioning system (GPS) module 619.

Broadcast reception module 611 may receive a broadcast signal and/or broadcast-related information from an external broadcast management server through a broadcast channel. The broadcast channel may include a satellite channel and a terrestrial channel.

The broadcast signal and/or the broadcast-related information received through broadcast reception module 611 may be stored in memory 660.

Mobile communication module 613 transmits and receives a wireless signal to and from at least one selected from among a base station, an external terminal, and a server via a mobile communication network. The wireless signal may include a voice call signal, a video communication call signal, and various types of data based on text/multimedia message transmission and reception.

Wireless Internet module 615 is a module for wireless Internet access. Wireless Internet module 615 may be mounted inside or outside mobile terminal 600. For example, wireless Internet module 615 may perform wireless communication based on Wi-Fi or wireless communication based on Wi-Fi Direct.

NFC module 617 may perform wireless communication. In a case in which NFC module 617 is within a predetermined distance from a home appliance equipped with an NFC tag or an NFC module, i.e. NFC module 617 performs tagging, NFC module 617 may receive or transmit data from or to the home appliance.

In addition, Bluetooth, radio frequency identification (RFID), infrared data association (IrDA), ultra wideband (UWB), or ZigBee may be used as short range communication technology.

GPS module 619 may receive position information from a plurality of artificial GPS satellites.

A/V input unit 620 is provided to allow an audio signal or video signal input. A/V input unit 620 may include a camera 621 and a microphone 623.

User input unit 630 generates key input data input by a user to control the operation of the terminal. To this end, user input unit 630 may include a keypad, a dome switch, and a touch pad (static pressure or electrostatic). Particularly, in a case in which the touch pad forms a layered structure together with a display unit 651, an assembly of the touch pad and the display unit 651 may be called a touchscreen.

Sensing unit 640 may sense a current state of mobile terminal 600, such as an open or closed state of mobile terminal 600, the position of mobile terminal 600, and whether user contact with mobile terminal 600 has been performed, to generate a sensing signal to control the operation of mobile terminal 600.

Sensing unit 640 may include a proximity sensor 641, a pressure sensor 643, and a motion sensor 645. Motion sensor 645 may sense the motion or position of mobile terminal 600 using an acceleration sensor, a gyro sensor, a gravity sensor, etc. In particular, the gyro sensor is a sensor to measure angular velocity of mobile terminal 600. The gyro sensor may sense a direction (angle) of mobile terminal 600 rotated from a reference direction.

Output unit 650 may include a display unit 651, an acoustic output module 653, an alarm unit 655, and a haptic module 657.

Display unit 651 outputs, i.e., displays, information processed by mobile terminal 600.

Meanwhile, when display unit 651 and the touch pad are disposed as a layered structure to form a touchscreen as previously described, display unit 651 may also be used as an input device that allows a user to input information by touch in addition to an output device.

Acoustic output module 653 outputs audio data received from wireless communication unit 610 or stored in memory 660. Acoustic output module 653 may include a speaker and a buzzer.

Alarm unit 655 outputs a signal to inform about generation of an event of mobile terminal 600. For example, alarm unit 655 may output a signal in the form of vibration.

Haptic module 657 generates a variety of tactile effects that a user may feel. A typical example of the tactile effects generated by haptic module 657 is a vibration effect.

Memory 660 may store a program for processing or control of controller 680 or temporarily store input or output data (for example, phonebooks, messages, still images, moving images, etc.).

Interface unit 670 interfaces between mobile terminal 600 and all external devices connected to mobile terminal 600. Interface unit 670 may receive data or power from the external devices and transmit the received data or power to the respective components of mobile terminal 600. In addition, data may be transmitted from mobile terminal 600 to the external devices via interface unit 670.

Controller 680 controls operations of the respective components of mobile terminal 600, thereby controlling overall operation of mobile terminal 600. For example, controller 680 may perform control or processing for voice communication, data communication, and video communication. Additionally, controller 680 may further include a multimedia reproduction module 681 to reproduce multimedia. Multimedia reproduction module 681 may be incorporated into controller 680 in the form of hardware. Alternatively, multimedia reproduction module 681 may be configured in the form of software separately from controller 680.

Power supply unit 690 supplies external power or internal power to the respective components of mobile terminal 600 under control of controller 680.

The block diagram of FIG. 4 shows components constituting mobile terminal 600 according to the embodiment of the present invention. The respective components in the block diagram may be integrated, added, or omitted according to the specifications of an actually implemented mobile terminal 600. That is, two or more components may be combined into a single unit as needed. Alternatively, one component may be divided into two or more components as needed. In addition, functions performed by the respective blocks are illustrated to describe the embodiment of the present invention and, therefore, concrete operations or devices of the respective blocks do not restrict the scope of the present invention.

Figure 5:
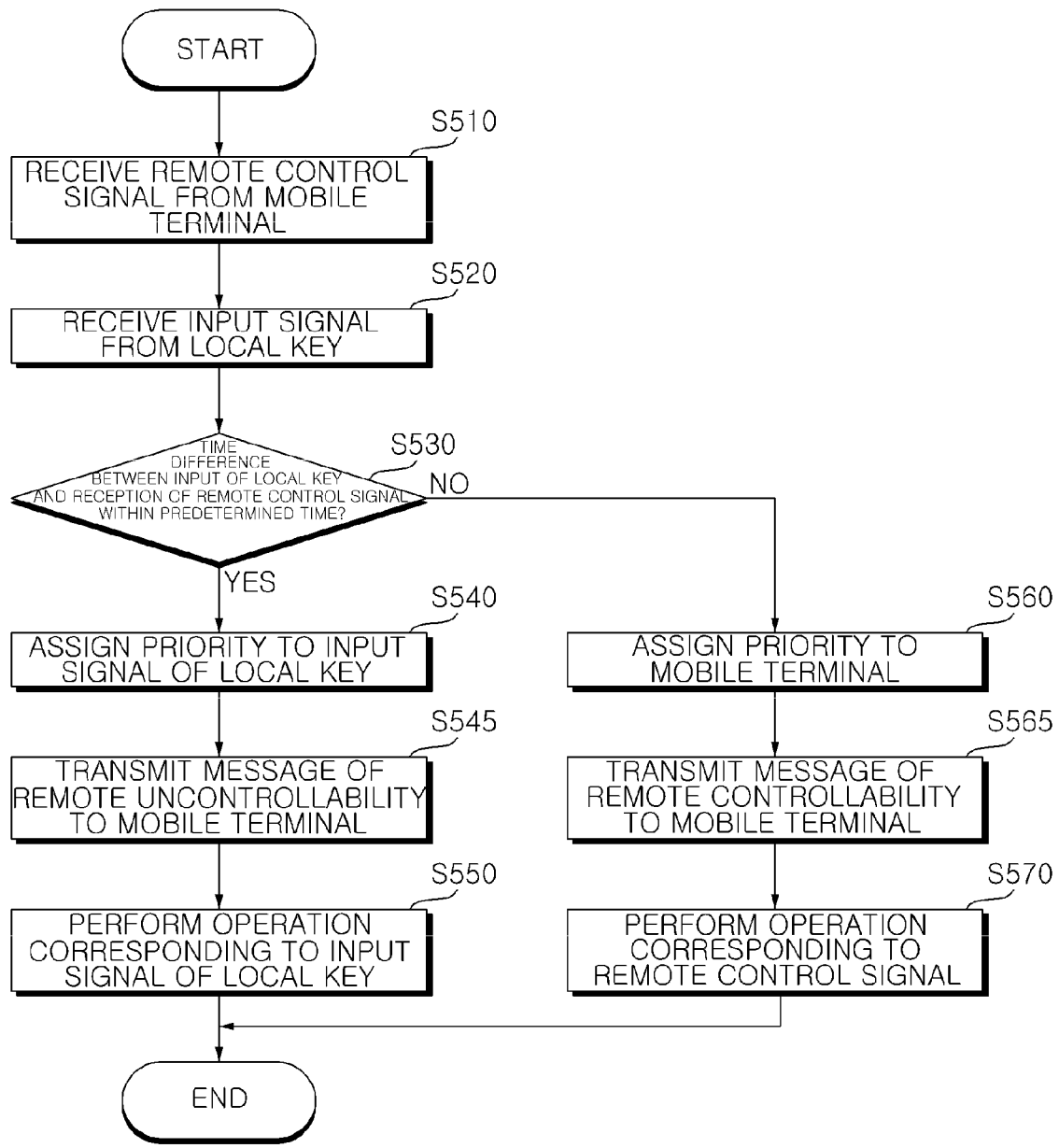
FIG. 5 is a flowchart showing an operation method of a home appliance according to an embodiment of the present invention.
Figure 6A:
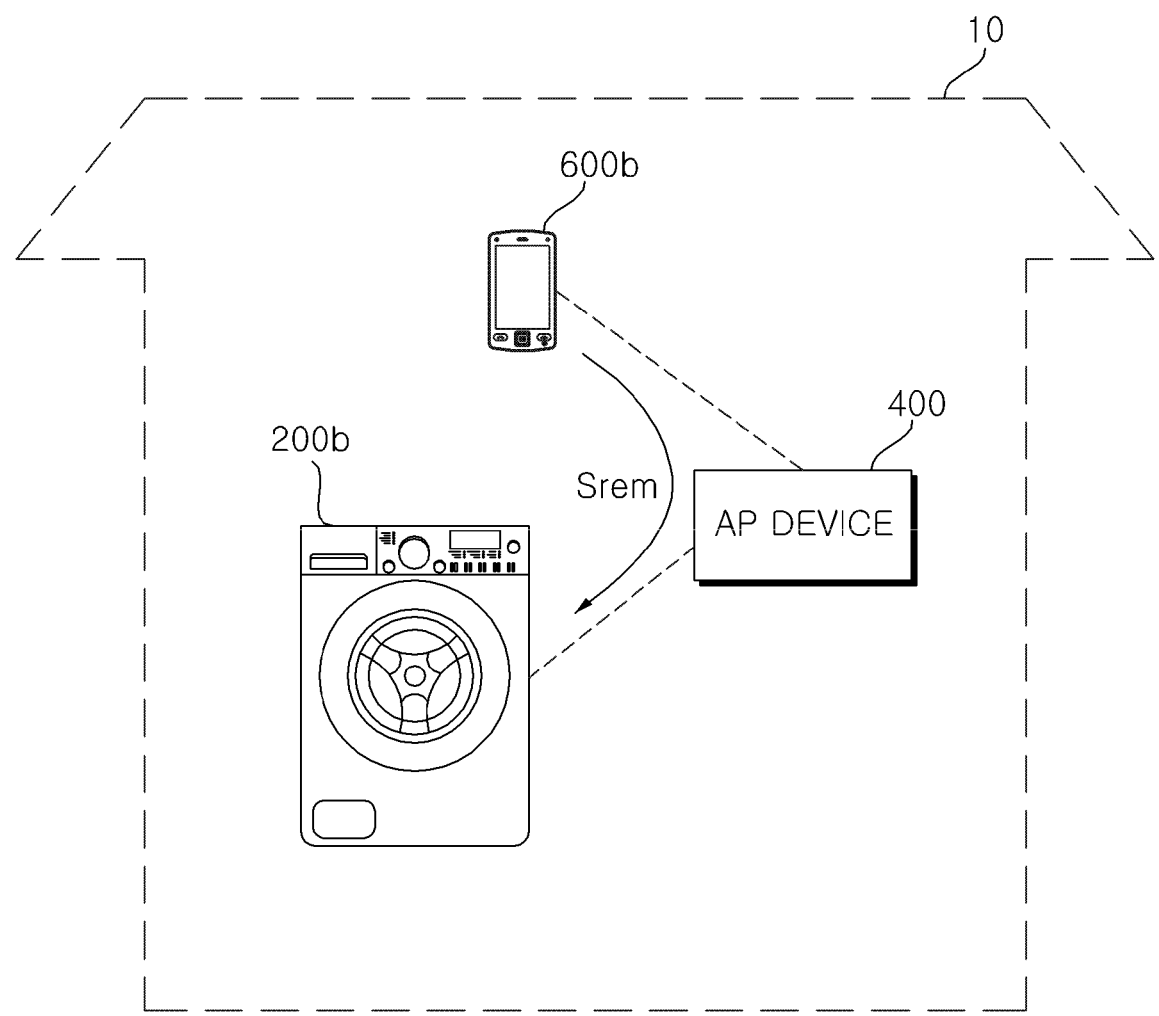
FIGS. 6 to 7E are reference views illustrating the operation method of FIG. 5.
Figure 6B:
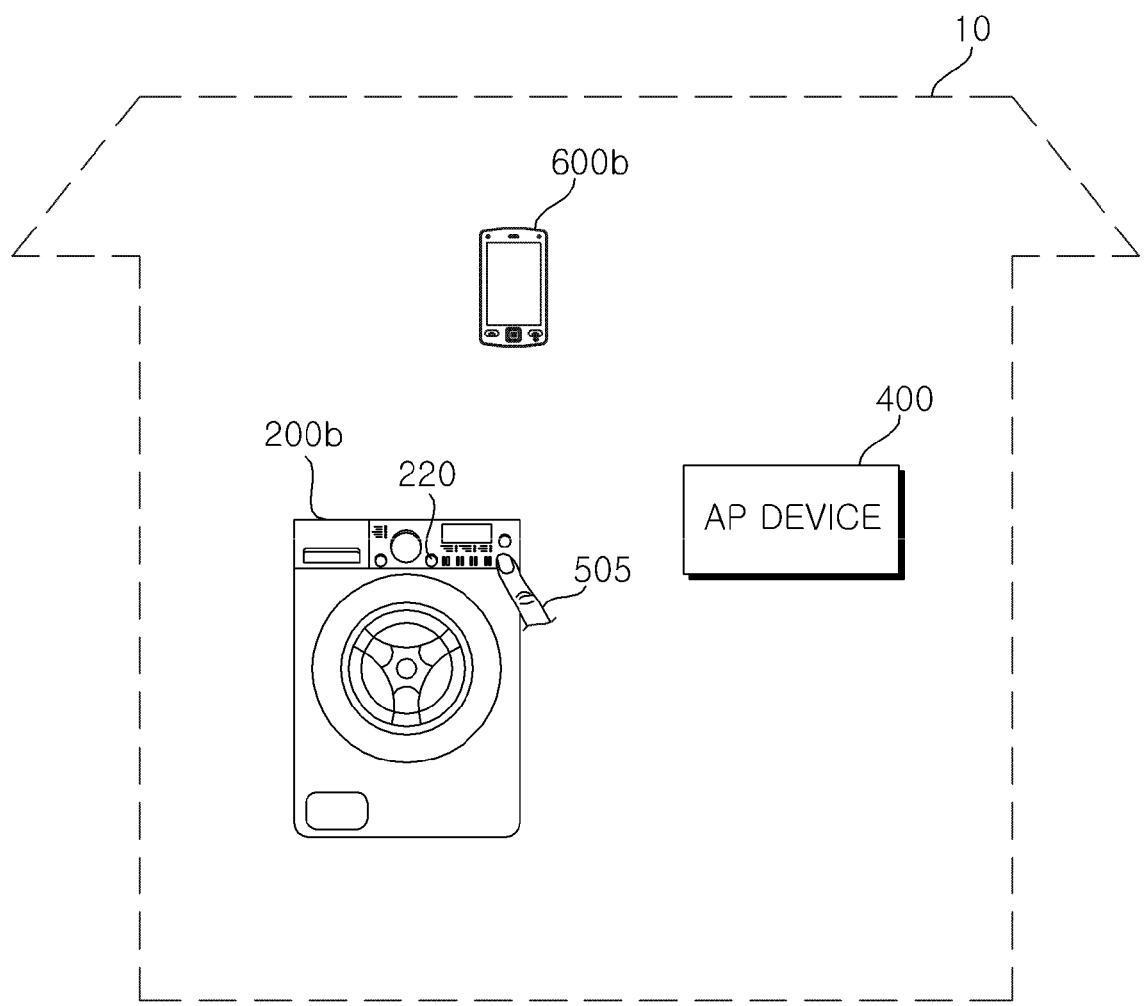
Figure 6C:
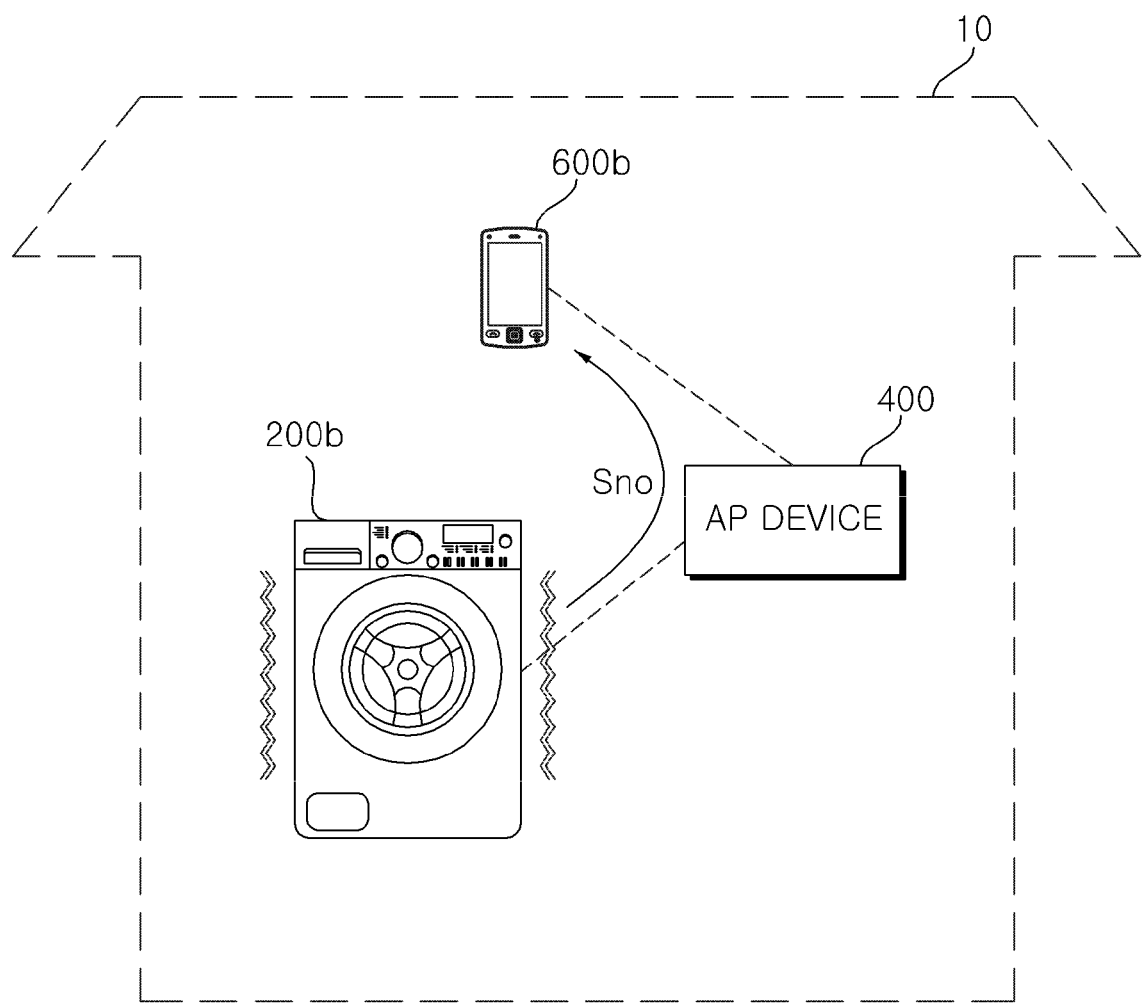
Figure 6D:
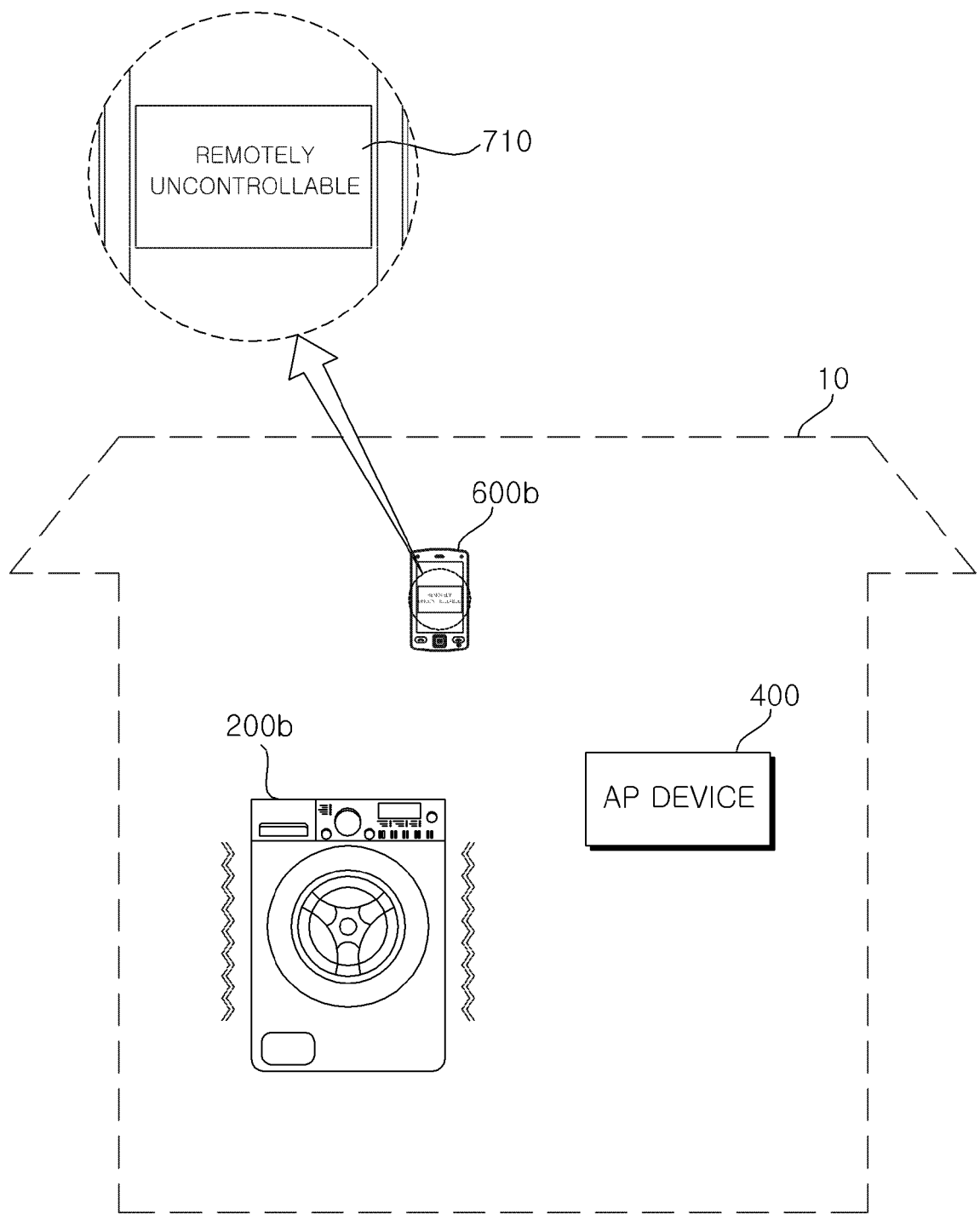
Figure 7A:
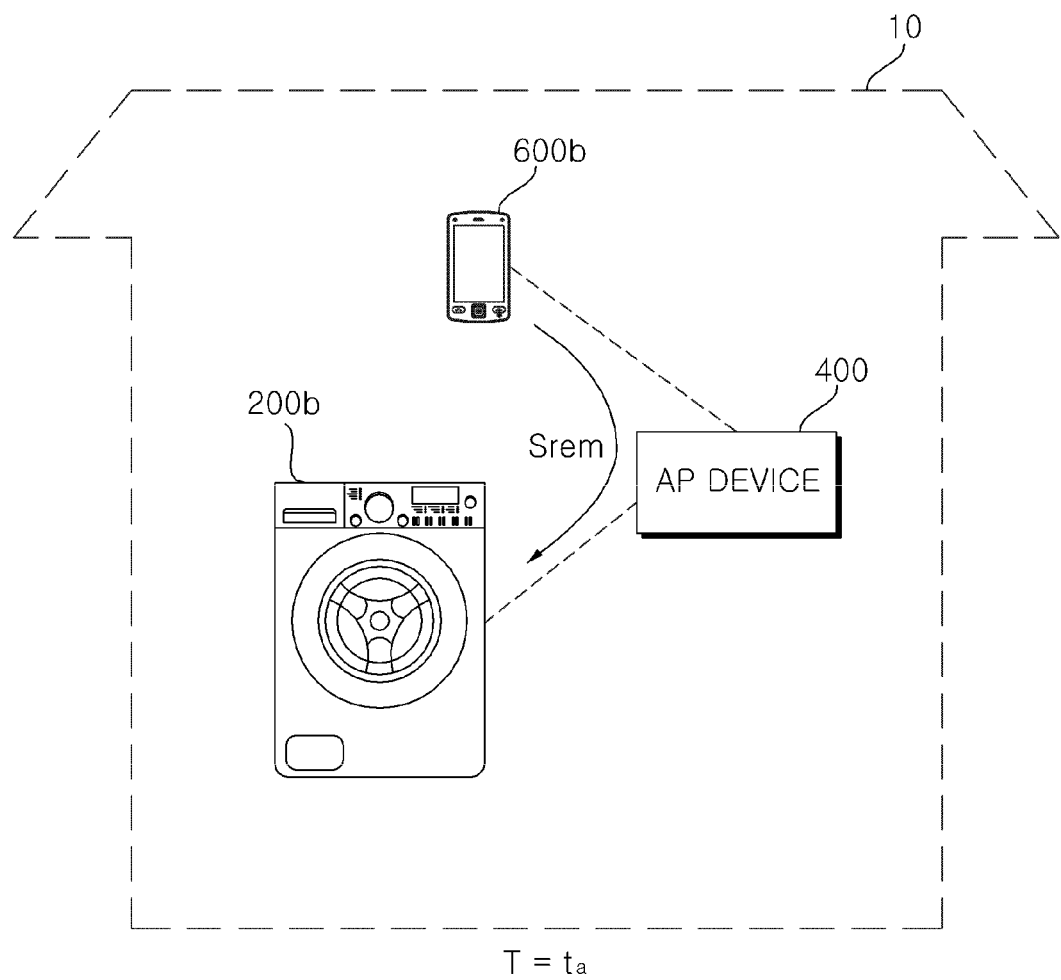
Figure 7B:
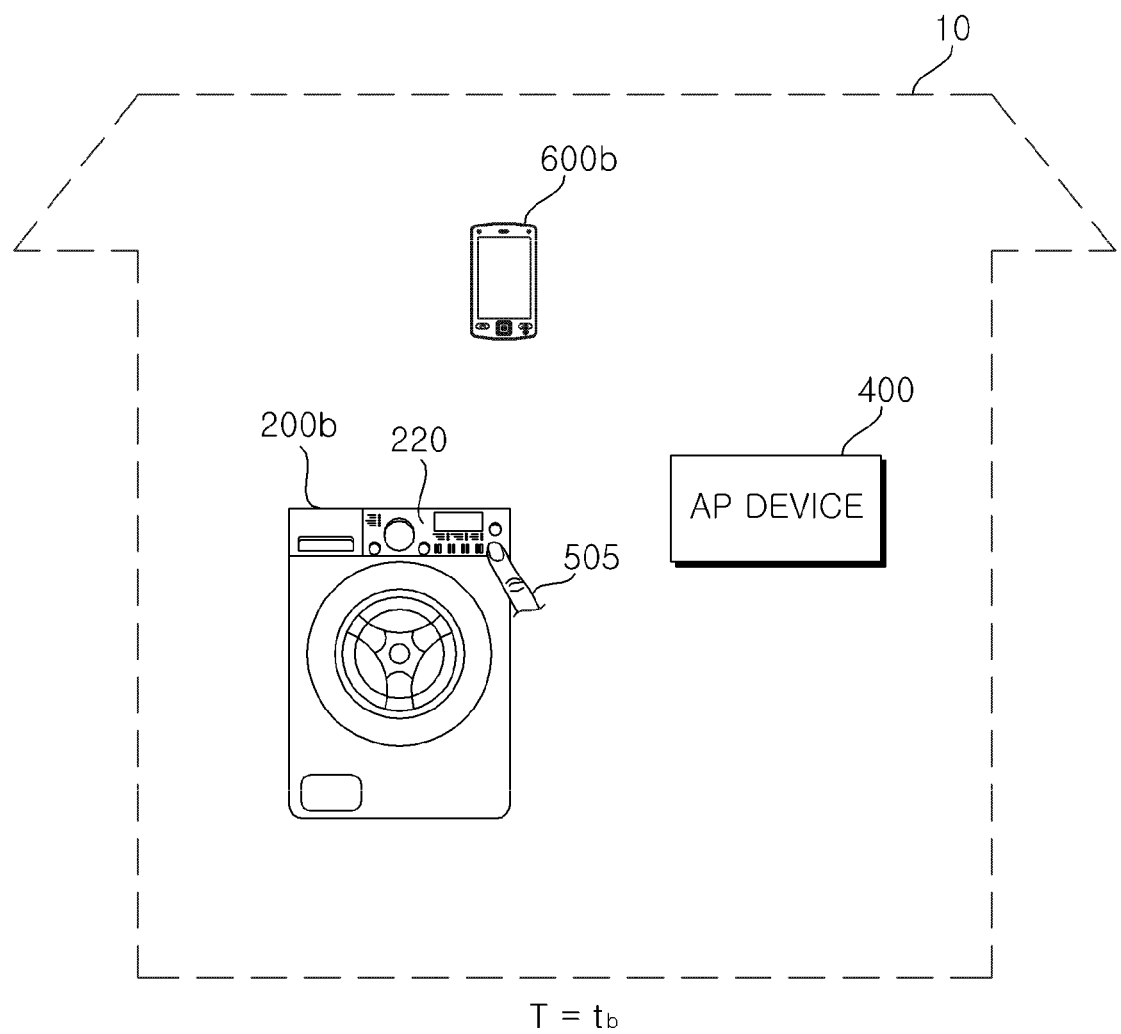
Figure 7C:
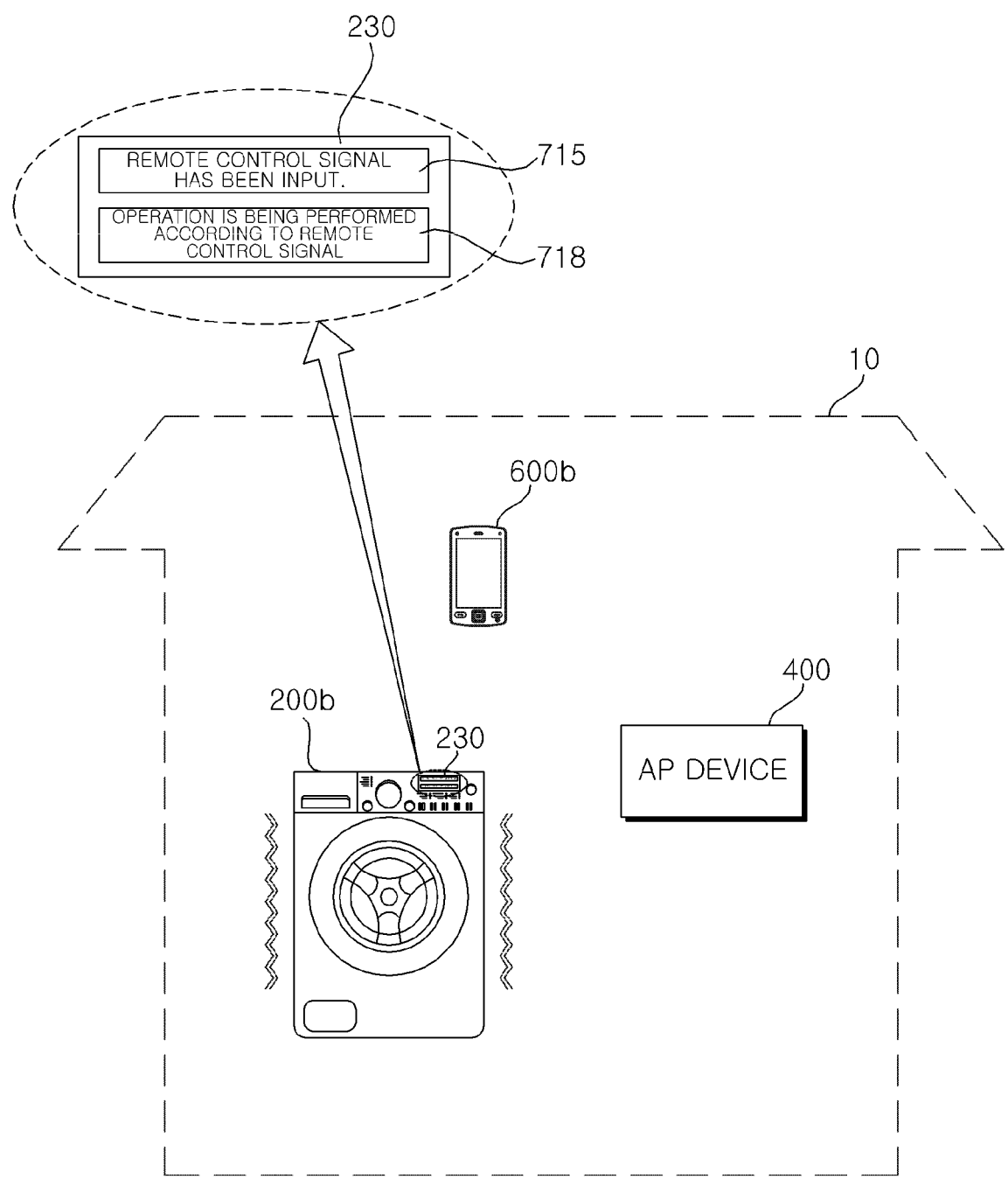
Figure 7D:
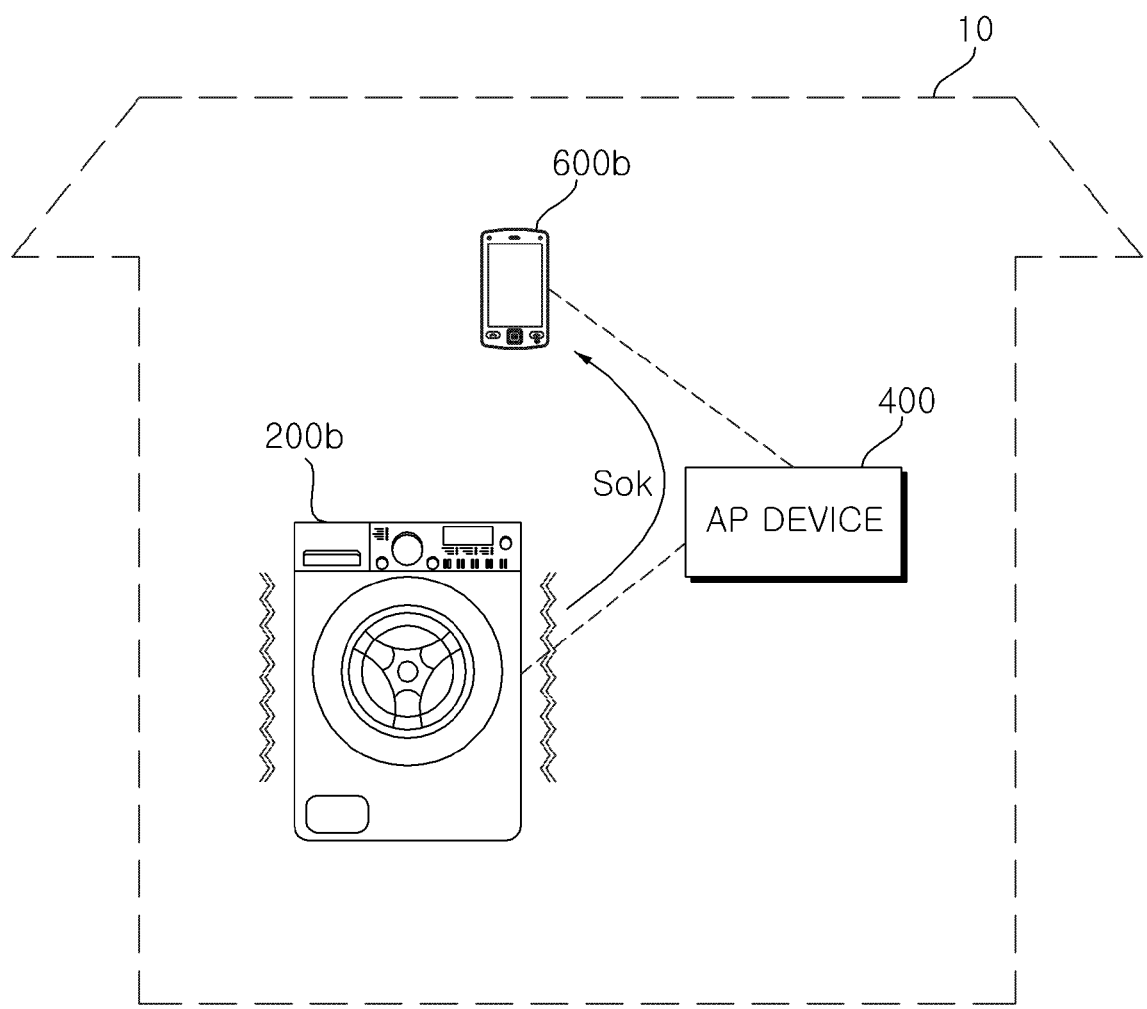
Figure 7E:
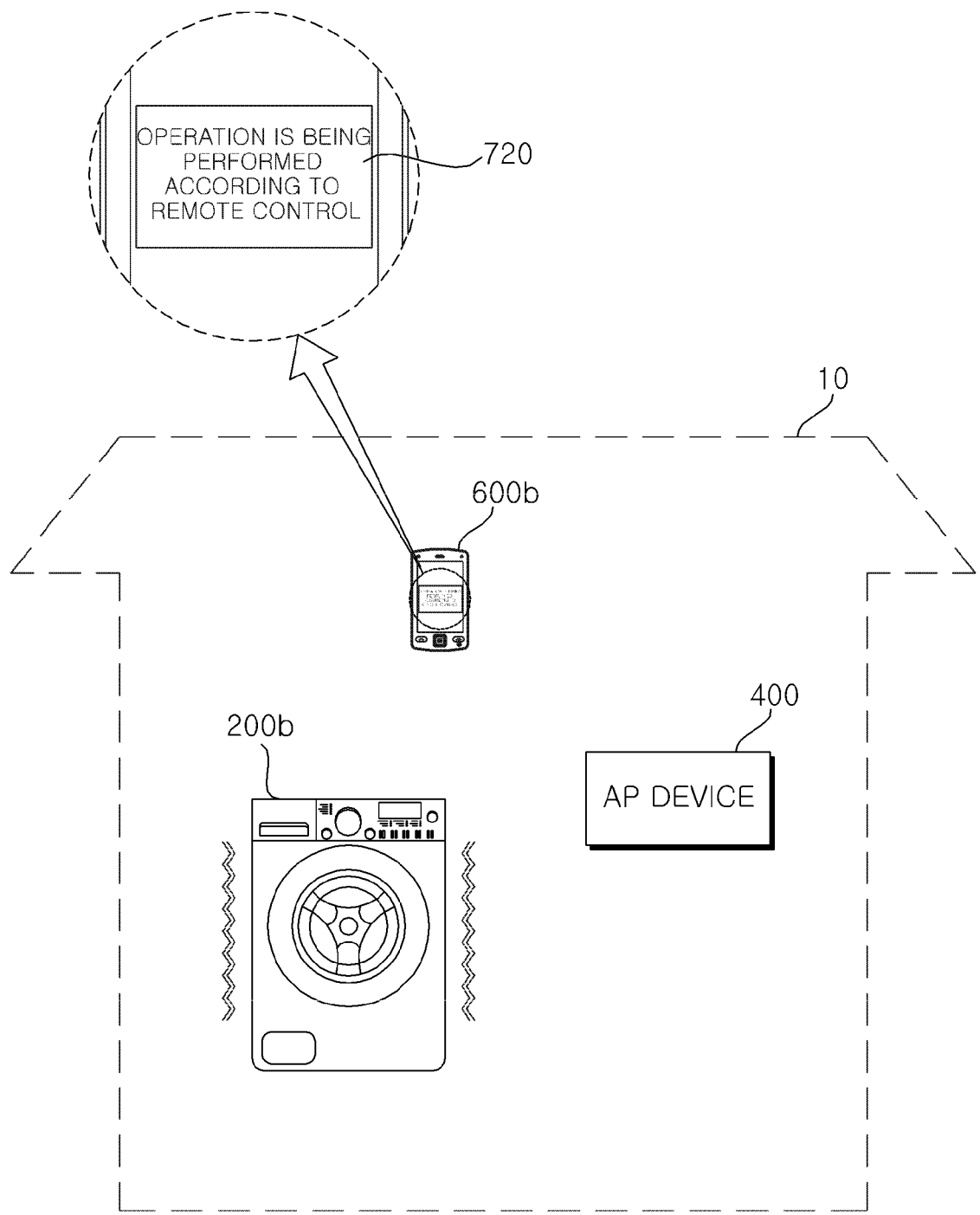

FIG. 5 is a flowchart showing an operation method of a home appliance according to an embodiment of the present invention and FIGS. 6 to 7E are reference views illustrating the operation method of FIG. 5.

Referring to the drawings, home appliance 200 receives a remote control signal from mobile terminal 600 (S510).

A user of mobile terminal 600 may execute an application related to the home appliance. In addition, the user of mobile terminal 600 may select remote control from among various items, such as remote control, monitoring, and failure diagnosis, through the application related to the home appliance.

For example, in a case in which the home appliance is a washing machine 200b. the user of mobile terminal 600 may transmit to washing machine 200b a remote control signal to power on washing machine 200b and to perform operation of washing machine 200b through the application related to the home appliance.

Consequently, washing machine 200b may receive the remote control signal via AP device 400.

FIG. 6A illustrates that mobile terminal 600b transmits a remote control signal, Srem, when mobile terminal 600b is located in a house, i.e. in internal network 10. The remote control signal Srem may be received by home appliance 200 via AP device 400. Communication unit 222 of home appliance 200 may transmit the received remote control signal to controller 270.

Meanwhile, the received remote control signal may be output to display unit 230 of home appliance 200. Consequently, the user located in the vicinity of the home appliance may easily confirm that the remote control signal has been received through a remote control reception message.

Subsequently, home appliance 200 receives a user input signal from the local key (S520).

Meanwhile, another user in the house may perform an input to power on home appliance 200 and/or to perform a predetermined operation of home appliance 200 through local key 220 of home appliance 200.

Consequently, home appliance 200 may receive the user input signal through input unit 220 and transmit the received user input signal to controller 270.

FIG. 6B illustrates that another user in the house generates a user input signal through local key 220 of home appliance 200. The user input signal may be transmitted to controller 280 via input unit 220.

Subsequently, controller 270 of home appliance 200 determines whether a time difference between the input of the local key and the reception of the remote control signal is within a predetermined time (S530). Upon determining that the time difference between the input of the local key and the reception of the remote control signal is within the predetermined time, controller 270 of home appliance 200 assigns priority to the user input signal according to the input of the local key (S540). Subsequently, home appliance 200 transmits a message of remote uncontrollability to the mobile terminal (S545). Subsequently, home appliance 200 performs an operation corresponding to the input of the local key (S550).

When the remote control signal is received first, controller 270 of home appliance 200 may control the home appliance to basically operate according to the remote control signal.

On the other hand, in a case in which the user input signal through local key 220 is received within a predetermined time after reception of the remote control signal, controller 270 of home appliance 200 assigns priority to the user input signal through the local key although the remote control signal is received first.

This is because it is more accurate to directly control home appliance 200 using the local key than to remotely control home appliance 200 using a remote control mode. Consequently, more weight is given to direct control of home appliance 200 using the local key such that priority is assigned to the user input signal according to the input of the local key. When the remote control signal is received and, almost at the same time, the local key is input, therefore, a control right may be given to a user who inputs the local key, i.e. a user who may control the home appliance while more accurately confirming a state of the home appliance in the vicinity of the home appliance, thereby improving user convenience and securing operation stability of the home appliance.

For example, at a first time $t_1$, a remote control signal including a signal to power on washing machine 200b and an about 1 hour operation signal including washing, rinsing, and spin drying may be received from the mobile terminal.

At a second time $t_2$ after the first time $t_1$, a user input signal including a signal to power on washing machine 200b and an about 40 minutes operation signal including washing, rinsing, and spin drying may be received from local key 220 of washing machine 200b.

Upon determining that a time difference between a point of time when the remote control signal including the power on signal and the operation signal has been received and a point of time when the user input signal including the power on signal and the operation signal has been received is within a predetermined time, controller 270 of washing machine 200b assigns priority to the user input signal and controls a corresponding operation to be performed. That is, controller 270 of washing machine 200b may control washing machine 200b to operate according to the about 40 minutes operation signal including washing, rinsing, and spin drying.

At this time, as shown in FIG. 6C, controller 270 of washing machine 200b may control a message of remote uncontrollability, Sno, to be transmitted to mobile terminal 600b. to which priority has not been assigned. In this case, communication unit 222 of washing machine 200b may transmit the message of remote uncontrollability, Sno, to mobile terminal 600b via AP device 400.

After reception of the message of remote uncontrollability, Sno, as shown in FIG. 6D, mobile terminal 600b may output a message of remote uncontrollability 710 to display unit 651. As a result, the user of mobile terminal 600b may intuitively confirm remote uncontrollability.

Upon determining at step S530 that the time difference between the input of the local key and the reception of the remote control signal exceeds the predetermined time, controller 270 of washing machine 200b performs step S560.

That is, home appliance 200 assigns priority to the mobile terminal (S560). Subsequently, home appliance 200 transmits a message of remote controllability to the mobile terminal (S565). Then, home appliance 200 performs an operation corresponding to the remote control (S570).

When the user input signal through local key 220 is received a predetermined time after the reception of the remote control signal, controller 270 of washing machine 200b assigns priority to the remote control signal.

This is because it is necessary to assign priority to the remote control signal when a predetermined time elapses in consideration of a standby time of the home appliance during which the home appliance does not temporarily operate after the reception of the remote control signal.

FIG. 7A illustrates that, at a first time $t_a$, a remote control signal including a signal to power on washing machine 200b and an about 1 hour operation signal including washing, rinsing, and spin drying is received from the mobile terminal.

FIG. 7B illustrates that, at a predetermined time after the first time, i.e. at a second time $t_b$, a user input signal including a signal to power on the washing machine 200b and an about 40 minutes operation signal including washing, rinsing, and spin drying is received from local key 220 of washing machine 200b.

In this case, controller 270 of home appliance 200 assigns priority to the remote control signal and controls a corresponding operation to be performed. That is, controller 270 of home appliance 200 may control about 1 hour operation to be performed.

FIG. 7C illustrates that a message 715 indicating that the remote control signal has been received and a message 718 indicating that the home appliance is operating according to the remote control signal are displayed on the display unit 230 of home appliance 200. Consequently, the local key user may easily confirm the reception of the remote control signal and the operation of the home appliance corresponding to the remote control signal.

On the other hand, as shown in FIG. 7D, controller 270 of home appliance 200 may control a message of remote controllability, Sok, to be transmitted to mobile terminal 600b. to which priority has been assigned. In this case, communication unit 222 of washing machine 200b may transmit the message of remote controllability, Sok, to mobile terminal 600b via AP device 400.

After reception of the message of remote controllability, Sok, as shown in FIG. 7E, mobile terminal 600b may output a message of remote controllability 720 to display unit 651. As a result, the user of mobile terminal 600b may intuitively confirm remote controllability.

FIG. 8 is a flowchart showing an operation method of a home appliance according to another embodiment of the present invention and FIGS. 9A to 10D are reference views illustrating the operation method of FIG. 8.

Referring to the drawings, home appliance 200 receives a remote control signal from first mobile terminal 600a (S810).

A user of first mobile terminal 600a may execute an application related to the home appliance. In addition, the user of first mobile terminal 600a may select remote control from among various items, such as remote control, monitoring, and failure diagnosis, through the application related to the home appliance.

For example, in a case in which the home appliance is a washing machine 200b. the user of first mobile terminal 600a may transmit to washing machine 200b a remote control signal to power on washing machine 200b and to perform operation of washing machine 200b through the application related to the home appliance.

Consequently, home appliance 200 may receive the remote control signal via AP device 400.

Figure 9A:
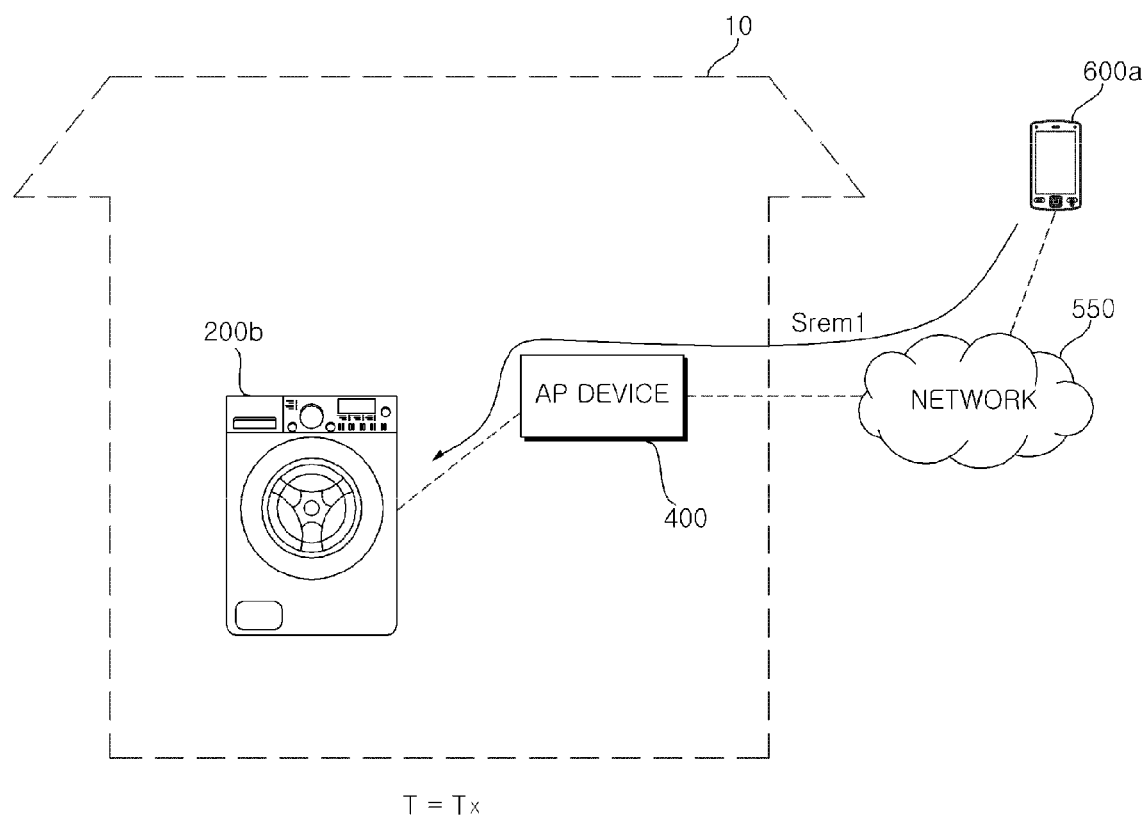
FIGS. 9A to 10D are reference views illustrating the operation method of FIG. 8.

FIG. 9A illustrates that first mobile terminal 600a transmits a remote control signal, Srem1, when first mobile terminal 600a is located outside a house (i.e., outside network 10). The remote control signal, Srem1, may be received by home appliance 200 via external network 550 and AP device 400. Communication unit 222 of home appliance 200 may transmit the received remote control signal to controller 270.

Meanwhile, the received remote control signal may be output to display unit 230 of home appliance 200. Consequently, the user located in the vicinity of the home appliance may easily confirm that the remote control signal has been received through a remote control reception message.

Subsequently, home appliance 200 receives a remote control signal from second mobile terminal 600b (S820).

Meanwhile, a user of second mobile terminal 600b may execute an application related to the home appliance. In addition, the user of second mobile terminal 600b may select remote control from among various items, such as remote control, monitoring, and failure diagnosis, through the application related to the home appliance.

For example, when the home appliance is a washing machine 200b. the user of second mobile terminal 600b may transmit to washing machine 200b a remote control signal to power on washing machine 200b and to perform operation of washing machine 200b through the application related to the home appliance.

Consequently, home appliance 200 may receive the remote control signal via AP device 400.

Figure 9B:
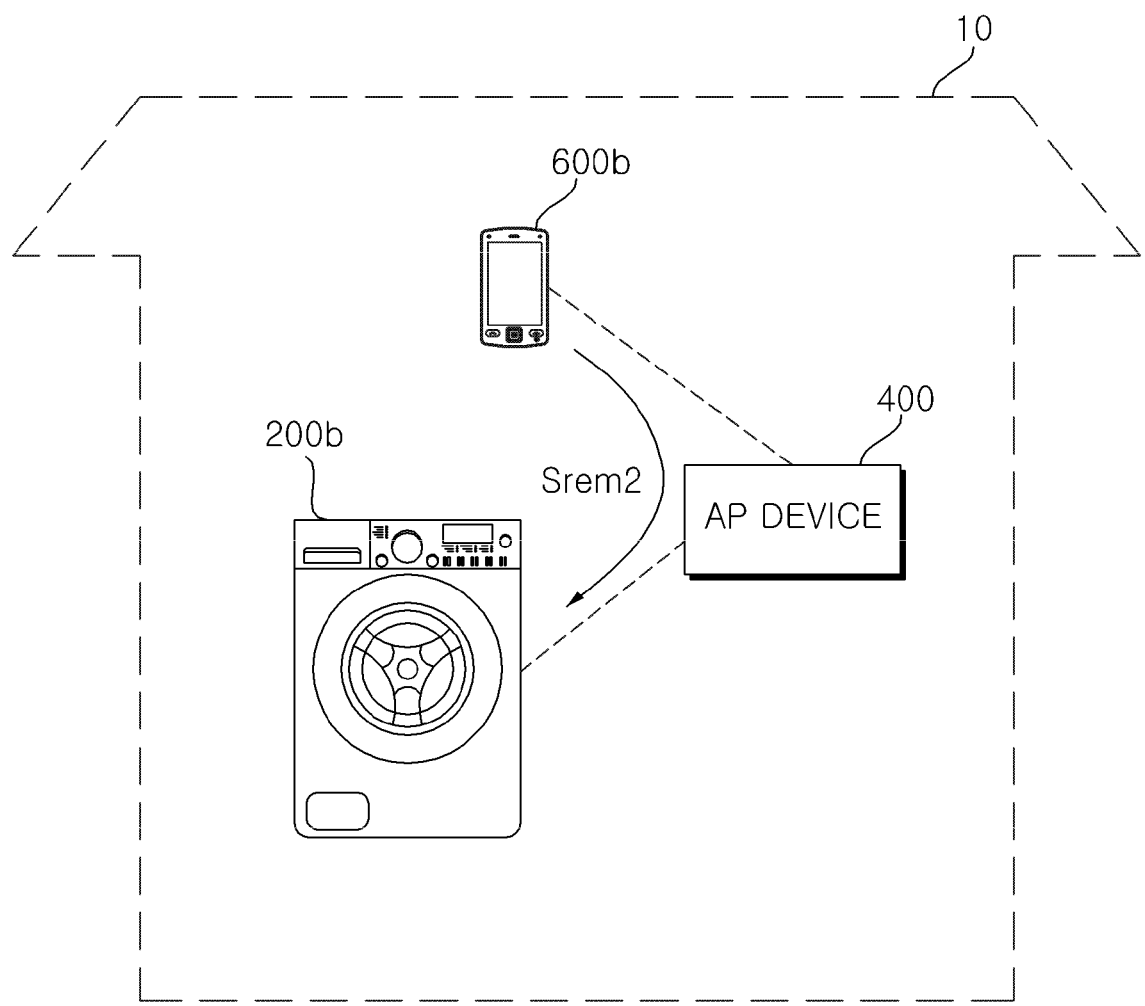

FIG. 9B illustrates that the user of second mobile terminal 600b transmits a remote control signal, Srem2, in a case in which second mobile terminal 600b is located in the house, i.e. in internal network 10. The remote control signal, Srem2, may be received by home appliance 200 via external network 550 and AP device 400. Communication unit 222 of home appliance 200 may transmit the received remote control signal to controller 270.

Subsequently, controller 270 of home appliance 200 assigns priority to the first received remote control signal (S840). Then, home appliance 200 transmits a message of remote uncontrollability to the mobile terminal to which priority has not been assigned (S845). Subsequently, home appliance 200 performs an operation corresponding to the remote control signal to which priority has been assigned (S850).

Controller 270 of home appliance 200 assigns priority to the first received remote control signal.

For example, as shown in FIG. 9A, at a first time $T_x$, a remote control signal including a signal to power on washing machine 200b and an about 1 hour operation signal including washing, rinsing, and spin drying may be received from first mobile terminal 600a.

As shown in FIG. 9B, at a second time $T_y$ after the first time, a user input signal including a signal to power on washing machine 200b and an about 40 minutes operation signal including washing, rinsing, and spin drying may be received from second mobile terminal 600b.

When a plurality of remote control signals is received, controller 270 of washing machine 200*b* may assign priority to the first received remote control signal. That is, controller 270 of washing machine 200*b* may assign priority to first mobile terminal 600*a*.

Figure 9C:
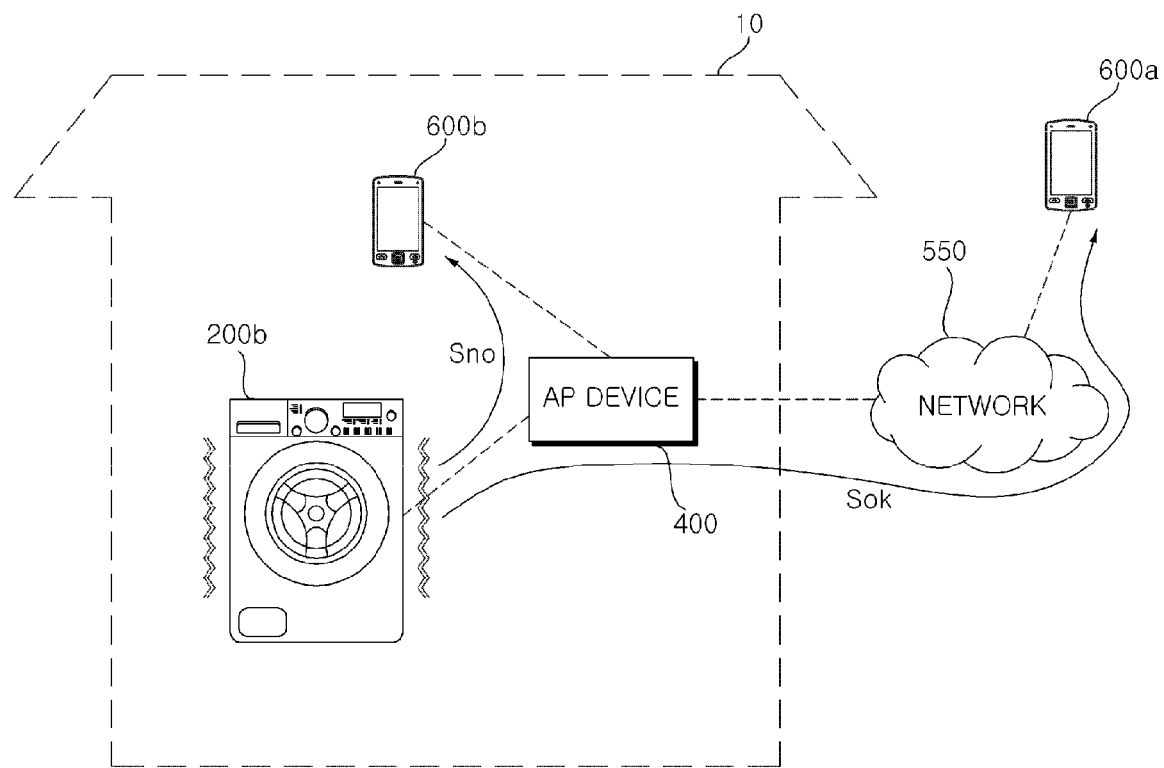

At this time, as shown in FIG. 9C, controller 270 of washing machine 200*b* may control a message of remote uncontrollability, Sno, to be transmitted to second mobile terminal 600*b*. to which priority has not been assigned. Additionally, controller 270 of washing machine 200*b* may control a message of remote controllability, Sok, to be transmitted to first mobile terminal 600*a*. to which priority has been assigned.

Consequently, communication unit 222 of washing machine 200*b* may transmit the message of remote uncontrollability, Sno, to second mobile terminal 600*b* via AP device 400. In addition, communication unit 222 of washing machine 200*b* may transmit the message of remote controllability, Sok, to first mobile terminal 600*a* via AP device 400 and external network 550.

Figure 9D:
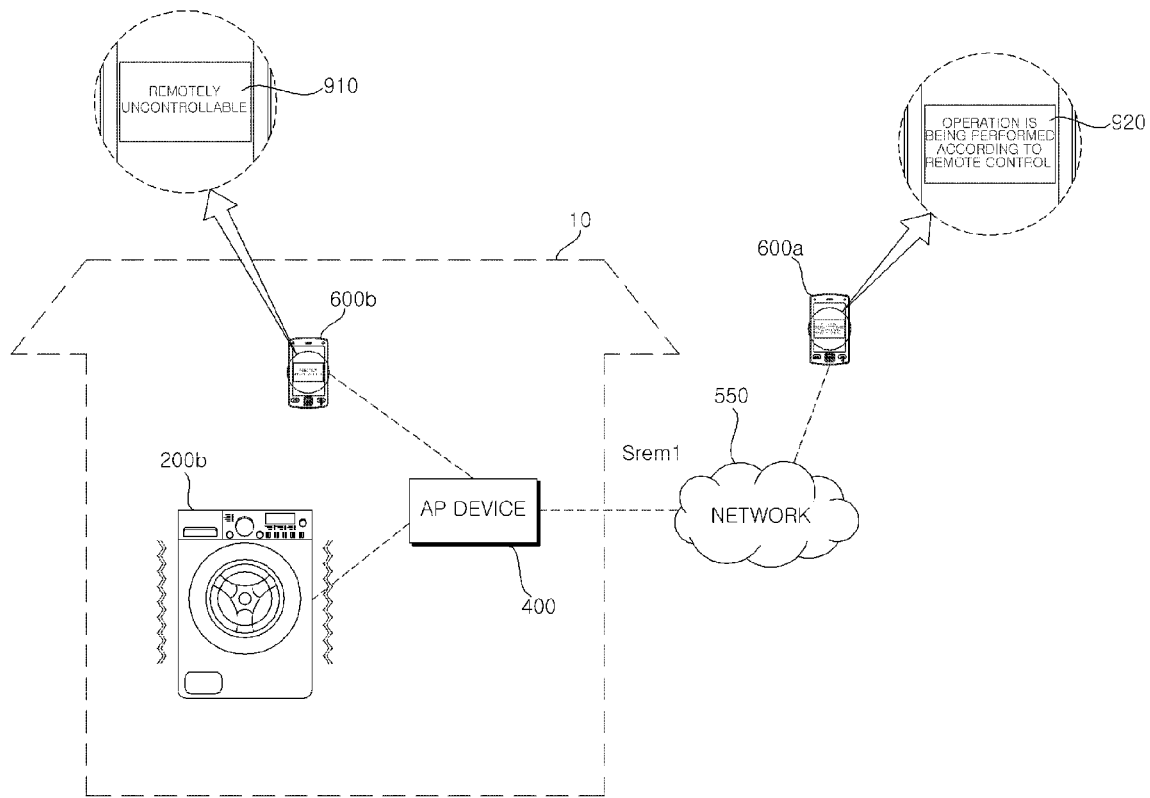

After reception of the message of remote uncontrollability, Sno, as shown in FIG. 9D, second mobile terminal 600*b* may output a message of remote uncontrollability 910 to display unit 651. In addition, after reception of the message of remote controllability, Sok, as shown in FIG. 9D, first mobile terminal 600*a* may output a message of remote controllability 920 to display unit 651. As a result, the users of the mobile terminals may intuitively confirm remote uncontrollability or remote controllability.

Meanwhile, in FIGS. 9A to 9D, the user of first mobile terminal 600*a* and the user of second mobile terminal 600*b* may be members of a family. Additionally, the user of first mobile terminal 600*a* and the user of second mobile terminal 600*b* may attempt to remotely control a home appliance disposed in a house to operate the home appliance.

When the user of first mobile terminal 600*a* and the user of second mobile terminal 600*b* transmit remote control signals to the home appliance, specifically, washing machine 200*b*. within a predetermined time difference as shown in the drawings, the home appliance may notify the respective mobile terminals 600*a* and 600*b* that the remote control signals have been received from users of different mobile terminals.

The home appliance may control chat windows to be displayed on the respective mobile terminals 600*a* and 600*b* such that chatting may be performed between the respective mobile terminals 600*a* and 600*b*. Consequently, the users of the respective mobile terminals 600*a* and 600*b* may share a desired remote control operation through chatting, thereby improving user convenience. Additionally, the users of the respective mobile terminals 600*a* and 600*b* may receive a proper operation command from the remote control signal.

Meanwhile, FIGS. 10A to 10D illustrate that second mobile terminal 600*b* first transmits a remote control signal, Sremb, at a first time $T_1$ and then first mobile terminal 600*a* transmits a remote control signal, Srema, at a second time $T_m$ unlike FIGS. 9A to 9D.

Consequently, controller 270 of washing machine 200*b* assigns priority to second mobile terminal 600*b*. which has transmitted the remote control signal first. Controller 270 of washing machine 200*b* controls a message of remote controllability, Sok, to be transmitted to second mobile terminal 600*b* and controls a message of remote uncontrollability, Sno, to be transmitted to first mobile terminal 600*a*.

Figure 10A:
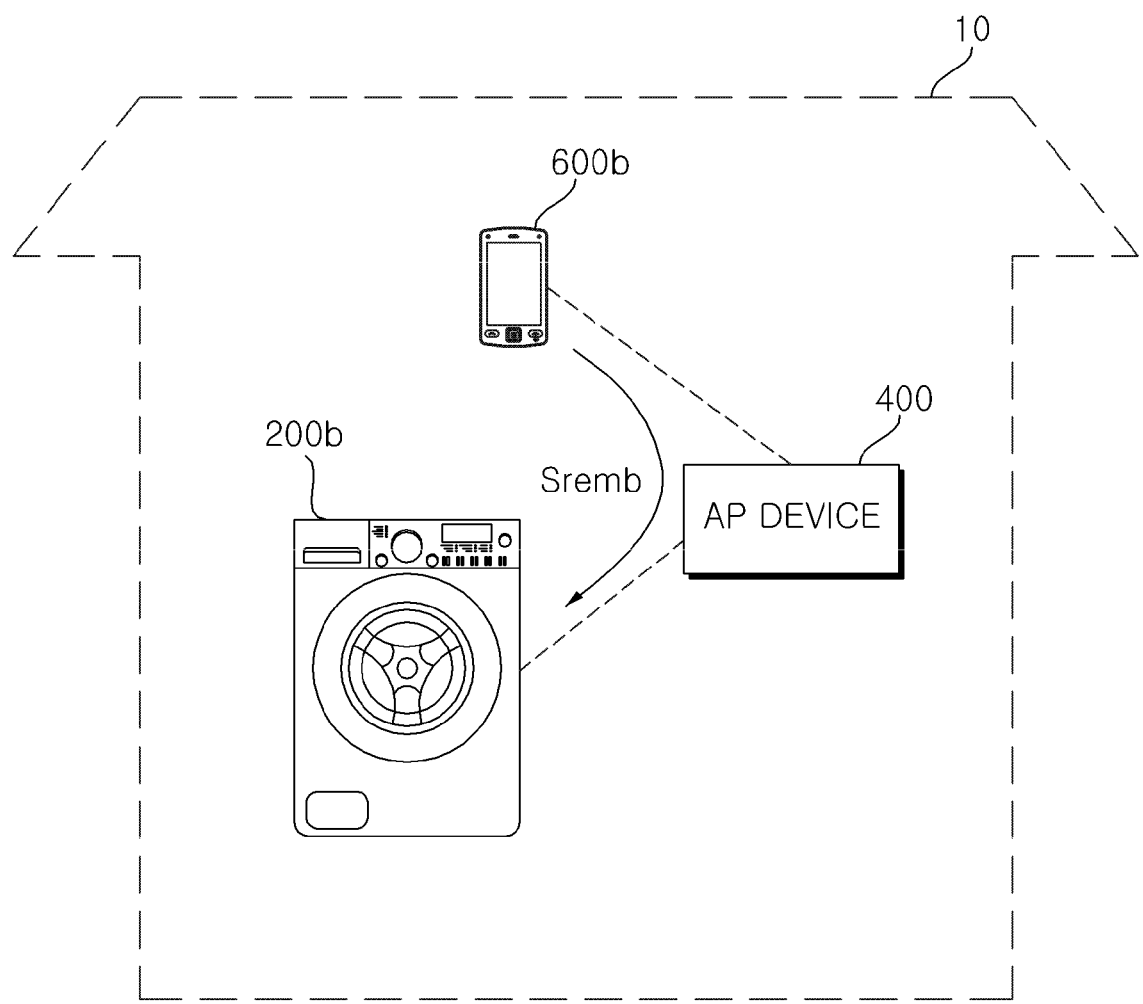
Figure 10B:
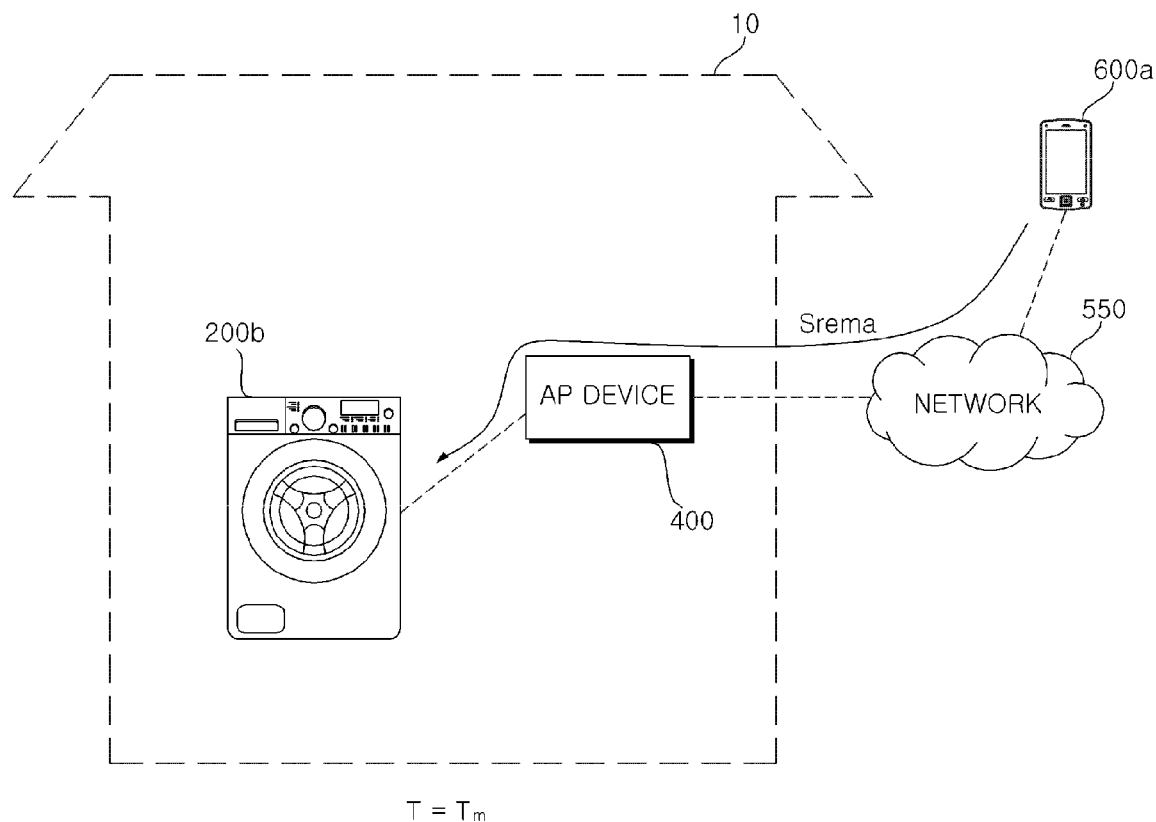
Figure 10C:
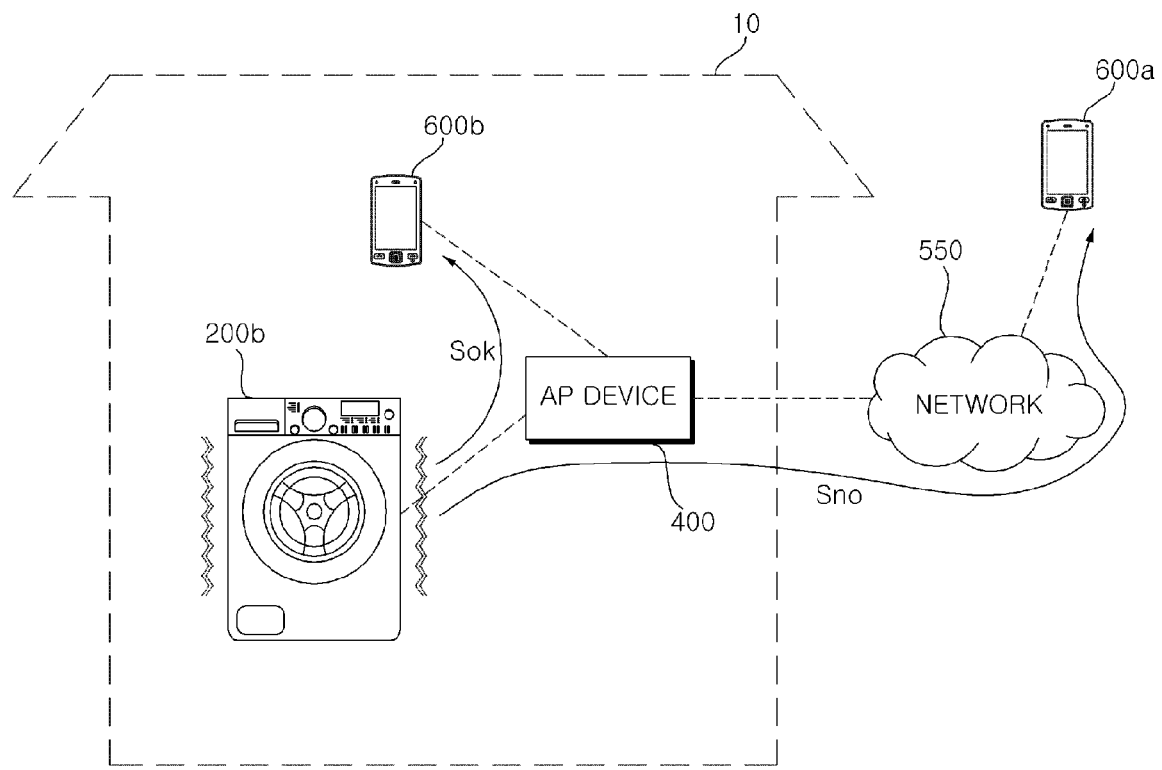
Figure 10D:
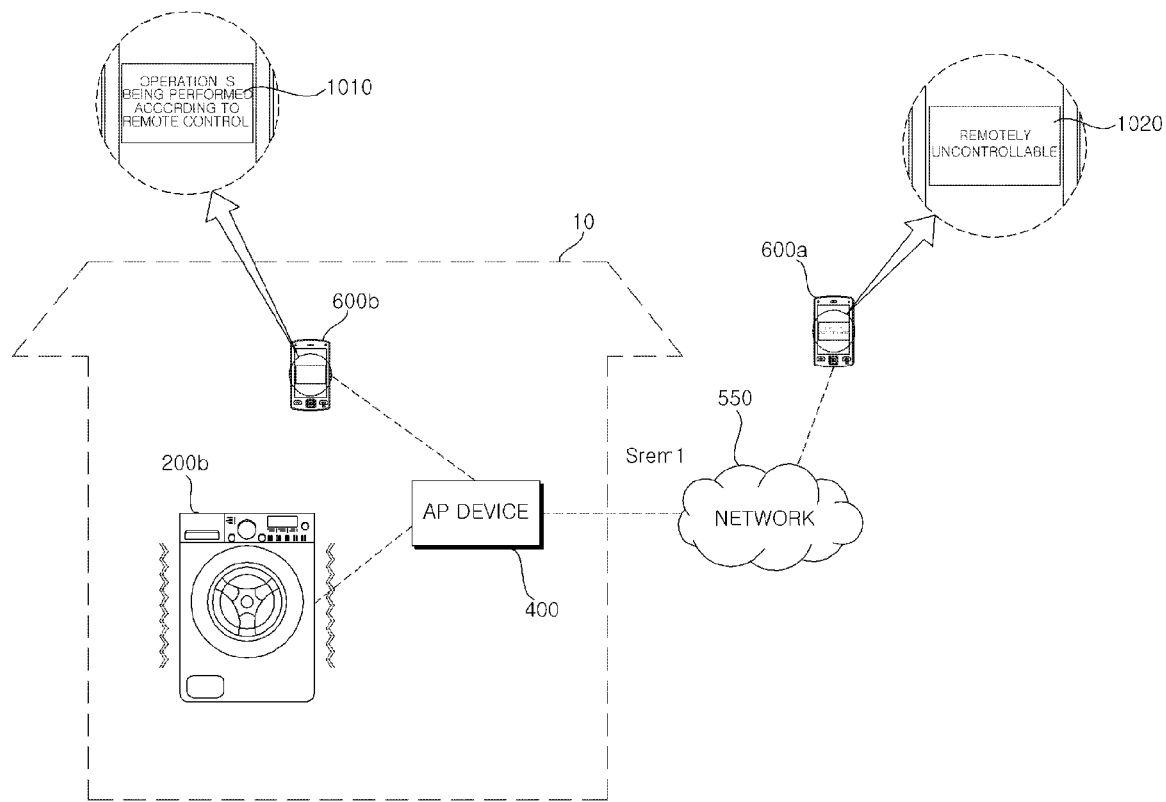

As shown in FIG. 10D, first mobile terminal 600*a* may output a message of remote uncontrollability 1020 to display unit 651 and second mobile terminal 600*b* may output a message of remote controllability 1010 to display unit 651.

As a result, the users of the mobile terminals may intuitively confirm remote uncontrollability or remote controllability.

Meanwhile, when a plurality of remote control signals is received, priority may be assigned to a mobile terminal located in a house unlike FIGS. 9A to 10D. That is, similarly to FIG. 5, when a remote control signal is received from first mobile terminal 600*a* located outside the house and then a remote control signal is received from second mobile terminal 600*b* located in the house within a predetermined time, i.e. almost at the same time, priority may be assigned to the remote control signal from second mobile terminal 600*b* although the remote control signal is received first from first mobile terminal 600*a*. That is, priority may be assigned to the mobile terminal nearer the home appliance, thereby improving operation stability of the home appliance.

On the other hand, when the remote control signal is received from second mobile terminal 600*b* located in the house after the lapse of the predetermined time, priority may be assigned to the first received remote control signal as previously described with reference to FIG. 8 and the following drawings.

Meanwhile, when at least one of remote control signals from a plurality of mobile terminals is a remote control signal to read data regarding the home appliance or to monitor the home appliance, the home appliance may transmit the data according to the remote control signal although priority is not assigned to the remote control signal.

Assignment of priority as described above may be applied to a remote control signal related to operation of the home appliance.

Figure 11:
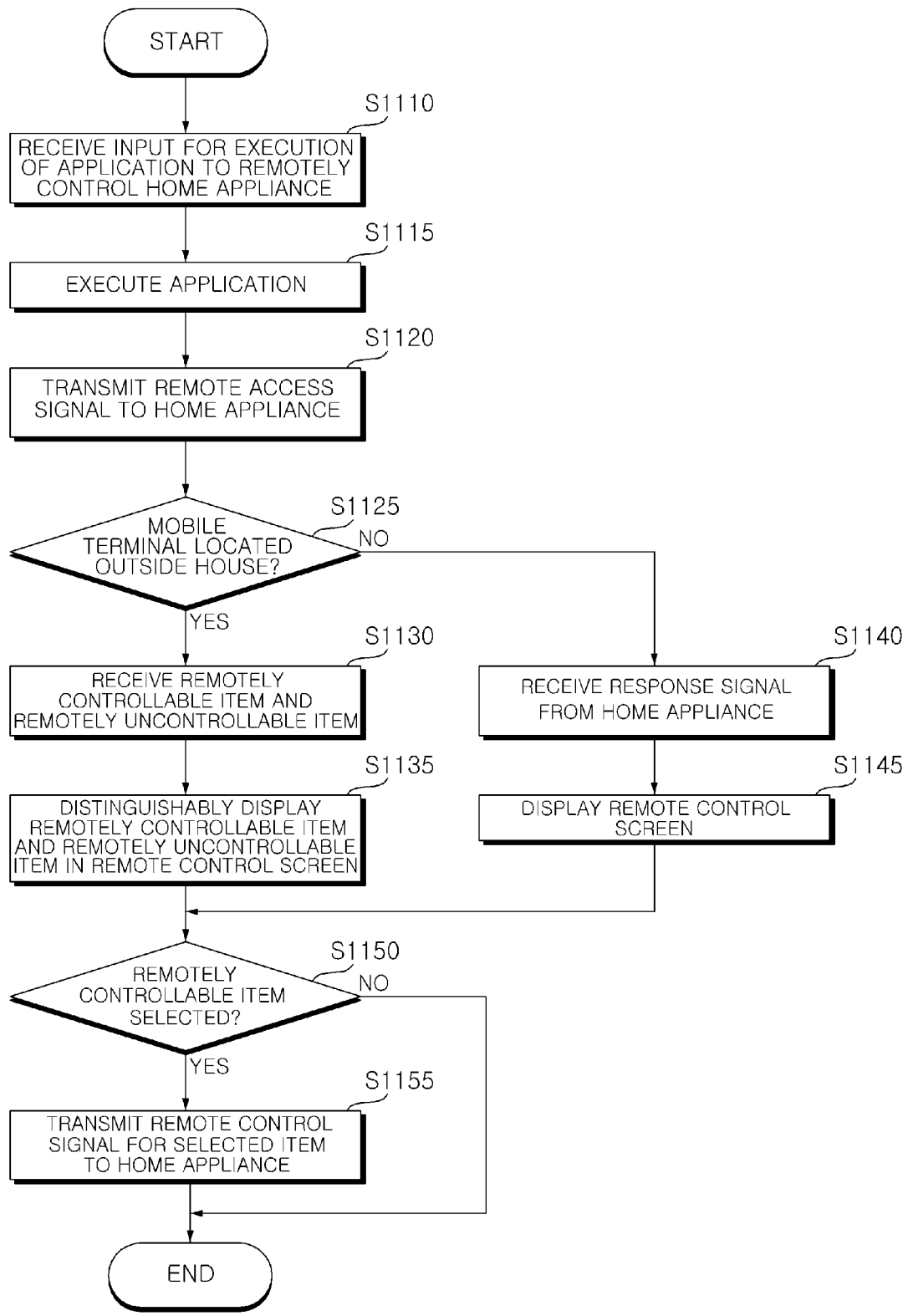
FIG. 11 is a flowchart showing an operation method of a mobile terminal according to another embodiment of the present invention.
Figure 12:
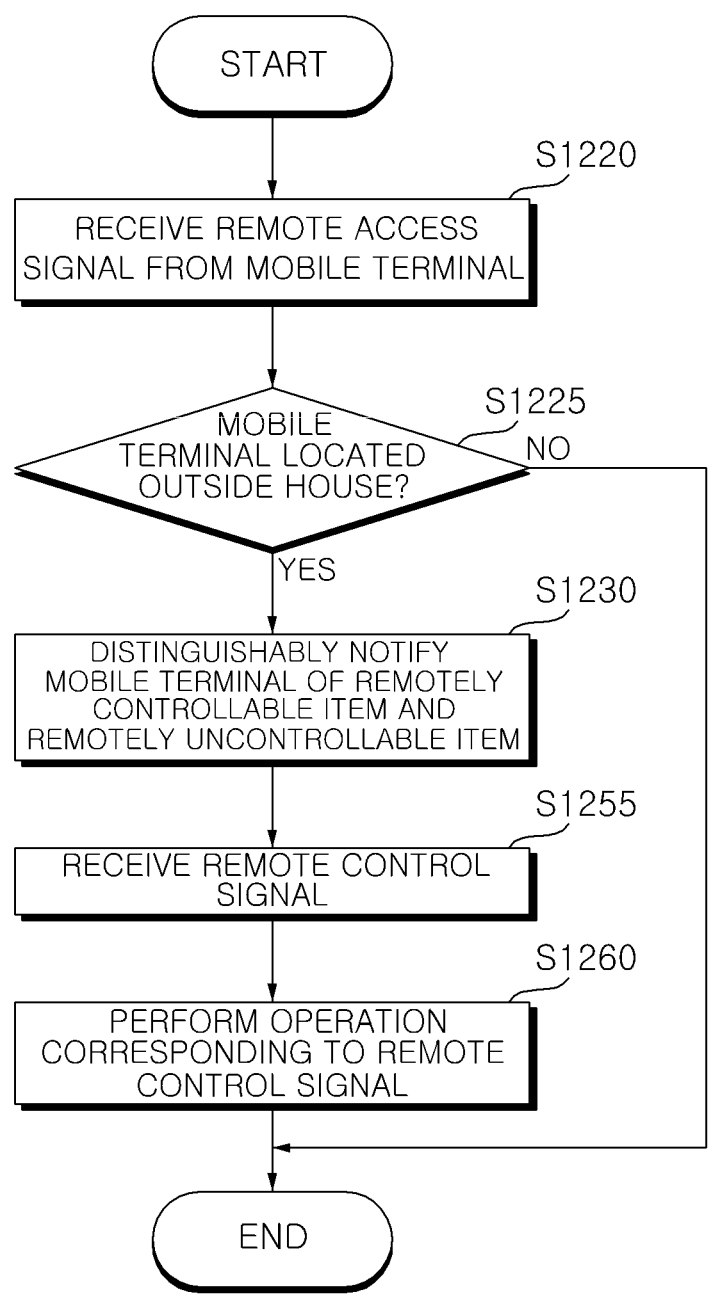
FIG. 12 is a flowchart showing an operation method of a home appliance according to a further embodiment of the present invention.

FIG. 11 is a flowchart showing an operation method of a mobile terminal according to another embodiment of the present invention, FIG. 12 is a flowchart showing an operation method of a home appliance according to a further embodiment of the present invention, and FIGS. 13 to 17G are reference views illustrating the operation method of FIG. 11 or 12.

Referring to the drawings, mobile terminal 600 receives an input for execution of an application to remotely control the home appliance (S1110). Subsequently, mobile terminal 600 executes the application. Meanwhile, step S1310 of FIG. 13 corresponds to step S1110 of FIG. 11 and step S1315 of FIG. 13 corresponds to step S1110 of FIG. 11.

Figure 14A:
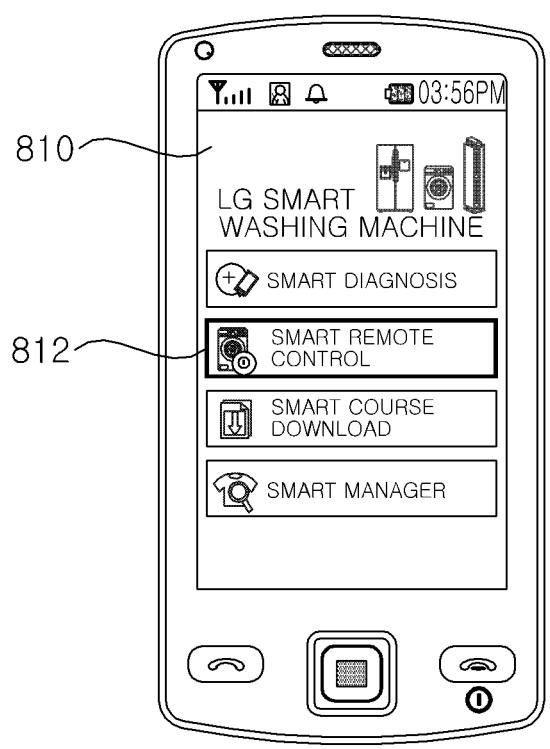

FIG. 14A illustrates that a home appliance-related application execution screen 810 is displayed on mobile terminal 600.

When mobile terminal 600 receives an input to execute a home appliance-related application from a user, controller 680 of mobile terminal 600 controls a pre-installed home appliance-related application to be driven.

Meanwhile, when no home appliance-related application is installed, mobile terminal 600 may access server 500 to download a home appliance-related application and to install the downloaded home appliance-related application therein.

In particular, FIG. 14A illustrates that application execution screen 810 includes a smart diagnosis item, a smart remote control item, a smart course download item, and a smart manager item as a home appliance-related application.

When the smart remote control item is selected, remote access to the home appliance may be attempted.

Subsequently, mobile terminal 600 transmits a remote access signal to home appliance 200 (S1120). In response thereto, home appliance 200 receives the remote access signal from mobile terminal 600 (S1220). Meanwhile, step S1320 of FIG. 13 corresponds to step S1120 of FIG. 11 and step S1220 of FIG. 12.

The remote access signal includes network information of mobile terminal 600. In addition, the remote access signal may include a signal regarding whether remote access to home appliance 200 is possible.

Figure 14B:
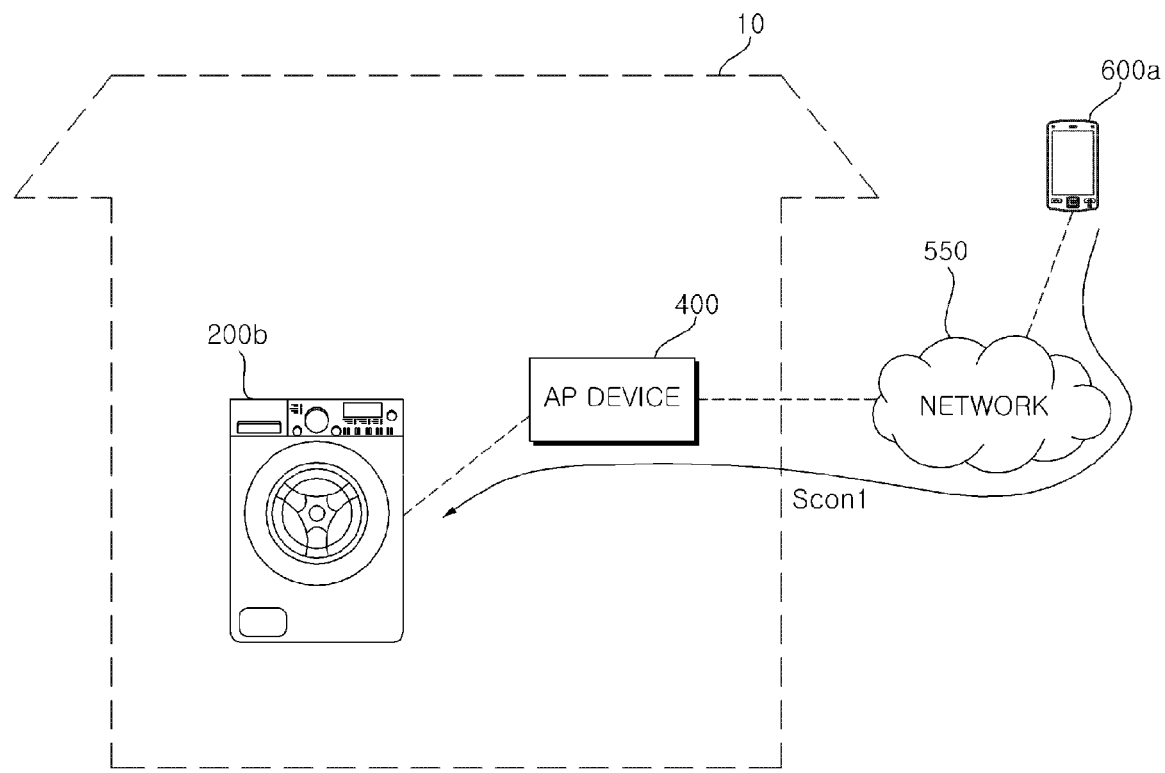

FIG. 14B illustrates that mobile terminal 600a is located outside internal network 10, i.e. outside the house. When a home appliance-related application as shown in FIG. 14A is executed in mobile terminal 600a located outside the house and a smart remote control item 812 is selected, mobile terminal 600a may transmit a remote access signal, Scon1, to washing machine 200b via external network 550 and AP device 40 for remote control.

Subsequently, home appliance 200 determines whether mobile terminal 600a is located outside the house based on the received remote access signal (S1225). Upon determining that mobile terminal 600a is located outside the house, home appliance 200 distinguishably notifies mobile terminal 600a of remotely controllable items and remotely uncontrollable items. In response thereto, when the mobile terminal 600 is located outside the house, mobile terminal 600 distinguishably receives the remotely controllable items and the remotely uncontrollable items from home appliance 200 (S1130). Meanwhile, step S1325 of FIG. 13 corresponds to step S1225 of FIG. 12 and step S1125 of FIG. 11. In addition, step S1330 of FIG. 13 corresponds to step S1230 of FIG. 12 and step S1130 of FIG. 11.

In one embodiment of the present invention, the home appliance determines whether the mobile terminal is located in internal network 10, i.e. in the house in which the home appliance is located, or outside the house and, upon determining that the mobile terminal is located outside the house, the home appliance sets remotely uncontrollable items. This is because it is necessary to restrict any dangerous operation when the home appliance operates in the house without a user.

For example, when a user outside the house remotely controls a washing machine through the mobile terminal, it may be restricted to set a spin drying time to 30 minutes or more. On the other hand, when the user outside the house remotely controls a cooking device through the mobile terminal, it may be restricted to set a cook heating time to more than 5 minutes.

The remotely controllable items and the remotely uncontrollable items may be confirmed based on the location of the mobile terminal which the home appliance attempts to remotely control.

During remote access, network information of mobile terminal 600 is received. Consequently, information regarding rough location of mobile terminal 600 may be inferred based on the network information of mobile terminal 600.

For example, when the mobile terminal is located in the same internal network 10, network information of the home appliance is identical to that of the mobile terminal. Consequently, home appliance 200 may determine that the mobile terminal is located in the house based on the fact that the network information of the home appliance is identical to that of the mobile terminal.

In another example, in a case in which the mobile terminal is located outside the house, the mobile terminal has network information based on a wireless communication environment. Consequently, home appliance 200 may determine that the mobile terminal is located outside the house based on the fact that the network information of the mobile terminal is different from the internal network information.

Upon determining that the mobile terminal is located outside the house, home appliance 200 distinguishably notifies the mobile terminal of remotely controllable items and remotely uncontrollable items.

Figure 14C:
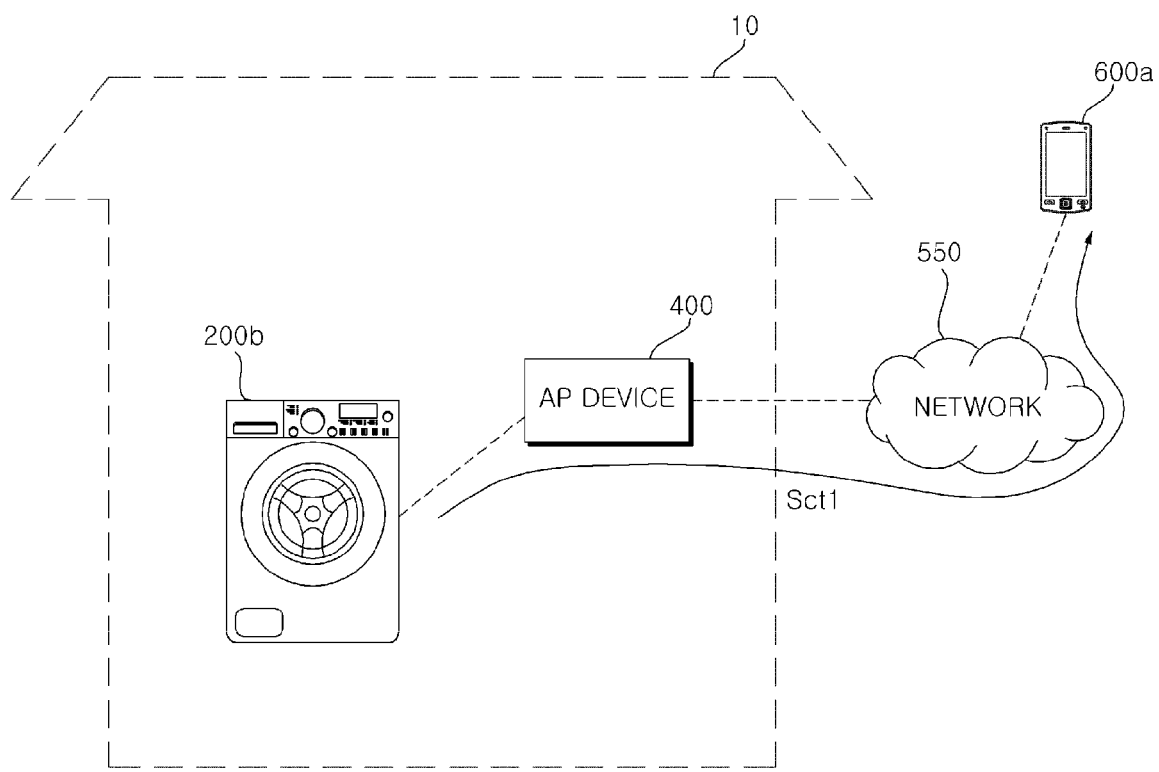

FIG. 14C illustrates that washing machine 200b transmits a notification, Sct1, including a remotely uncontrollable item and a remotely controllable item to mobile terminal 600a located outside the house.

Subsequently, mobile terminal 600a distinguishably displays the remotely uncontrollable item and the remotely controllable item in the remote control screen based on the received notification (S1135). Mobile terminal 600a then determines whether the remotely controllable item has been selected (S1150). Upon determining that the remotely controllable item has been selected, mobile terminal 600a transmits a remote control signal for the selected item to home appliance 600 (S1155). In response thereto, home appliance 600 receives the remote control signal (S1255) and performs an operation corresponding to the remote control signal (S1260).

Figure 13:
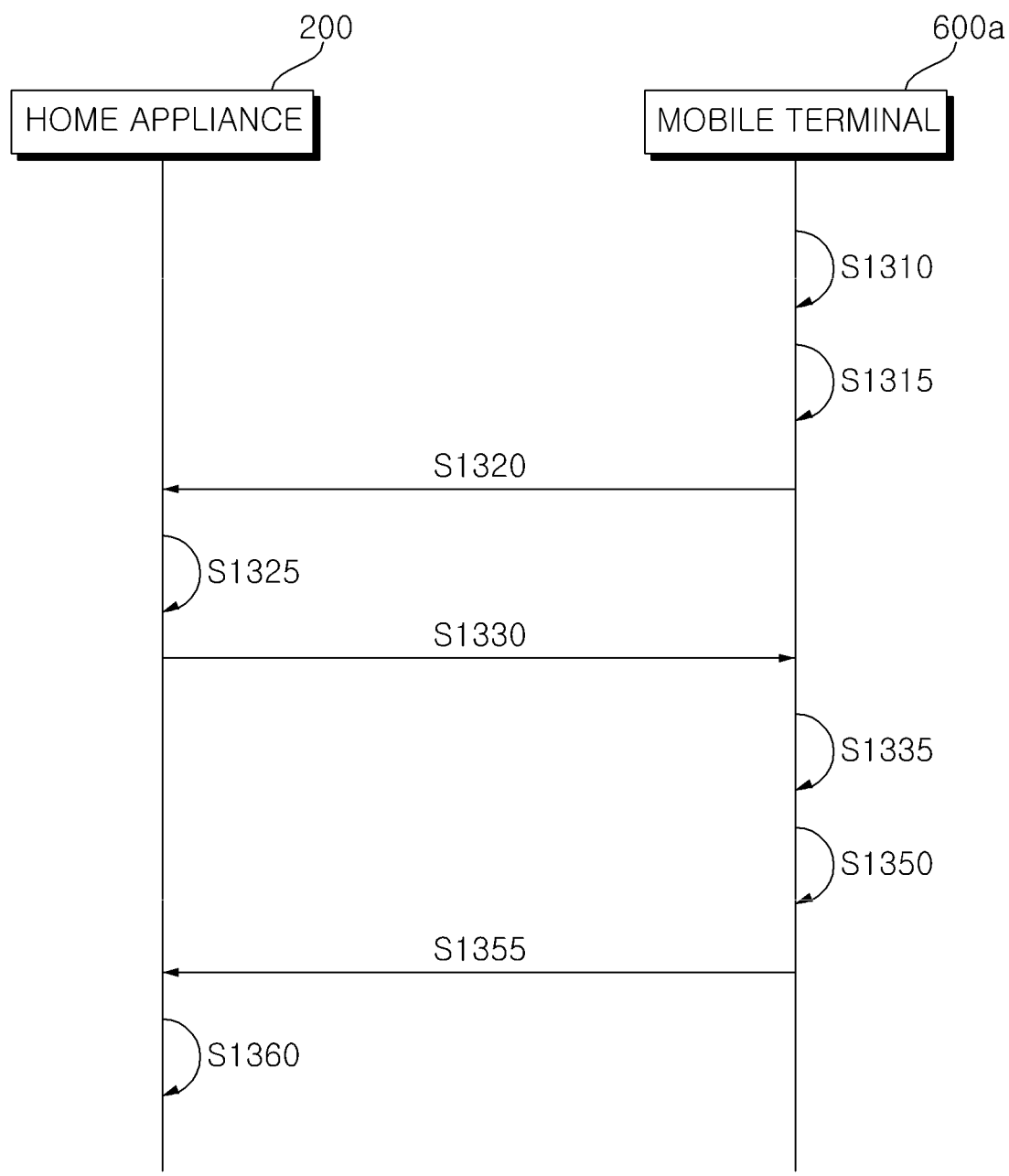
FIGS. 13 to 17G are reference views illustrating the operation method of FIG. 11 or 12.

Meanwhile, step S1335 of FIG. 13 corresponds to step S1135 of FIG. 11, step S1350 of FIG. 13 corresponds to step S1150 of FIG. 11, step S1355 of FIG. 13 corresponds to step S1155 of FIG. 11 and step S1255 of FIG. 12, and step S1360 of FIG. 13 corresponds to step S1260 of FIG. 12.

Figure 14D:
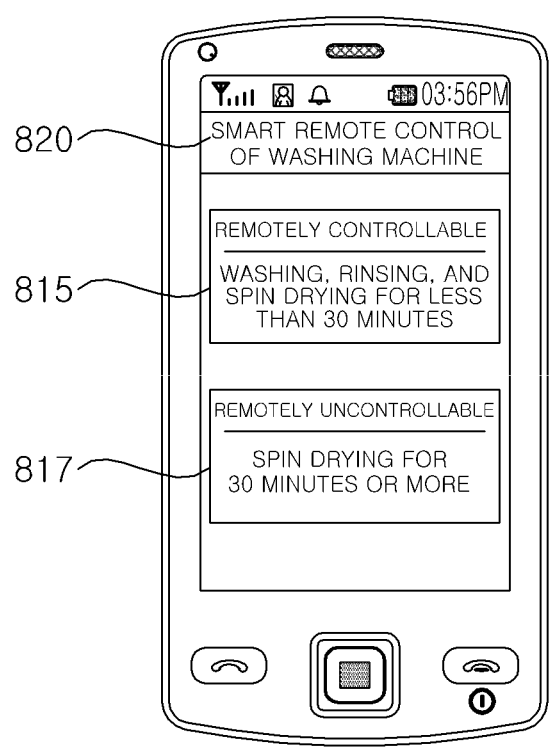

FIG. 14D illustrates that, when mobile terminal 600a is located outside the house, mobile terminal 600a displays a remote control screen 820 including a remotely uncontrollable item 817 and a remotely controllable item 815 based on the notification, Sct1, received from washing machine 200b.

For example, remotely controllable item 815 may be "washing, rinsing, and spin drying for less than 30 minutes" as shown in FIG. 14D and the remotely uncontrollable item 817 may be "spin drying for 30 minutes or more" as shown in FIG. 14D.

The user of mobile terminal 600a located outside the house may intuitively recognize the remotely controllable item and the remotely uncontrollable item.

On the other hand, mobile terminal 600a may differently display the remotely controllable item 815 and the remotely uncontrollable item 817 at the time of displaying remote control screen 820. For example, the remotely controllable item 815 may be highlighted and the remotely uncontrollable item 817 may be shaded. Consequently, the user of mobile terminal 600a may more intuitively recognize the remotely controllable item and the remotely uncontrollable item.

Figure 14E:
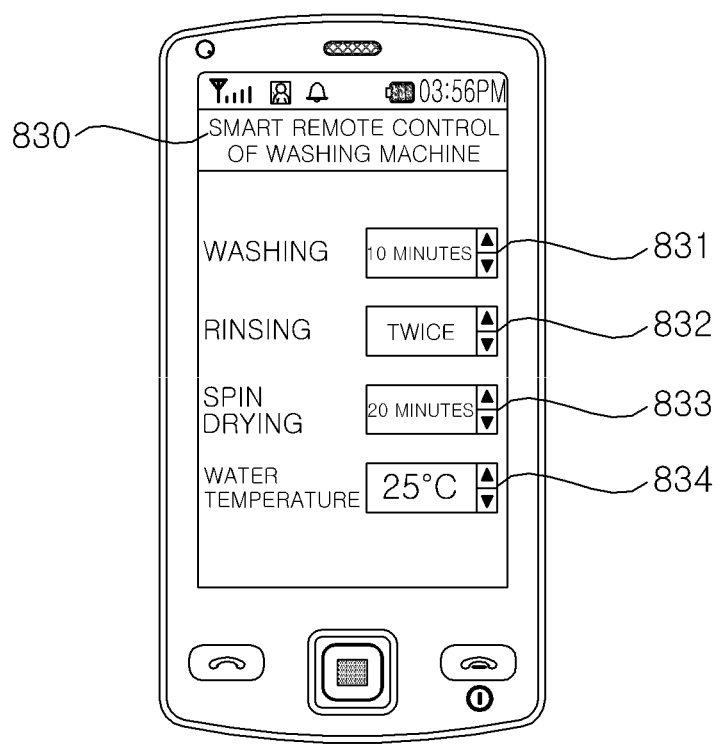

FIG. 14E illustrates a remote control screen 830 that can be set by a user. Remote control screen 830 may include a washing setting item 831, a rinsing setting item 832, a spin drying setting item 833, and a water temperature setting item 834.

At the spin drying setting item 833, it may be restricted to set a spin drying time to 30 minutes or more.

FIG. 14E illustrates washing for 10 minutes, rinsing twice, spin drying for 20 minutes, and a water temperature of 25° C. However, various other examples may be given.

Meanwhile, in FIG. 14E, when the remotely uncontrollable item is selected, e.g. a spin drying time is set to 30 minutes or more, a message indicating remote uncontrollability may be displayed. As a result, user convenience may be improved.

Figure 14F:
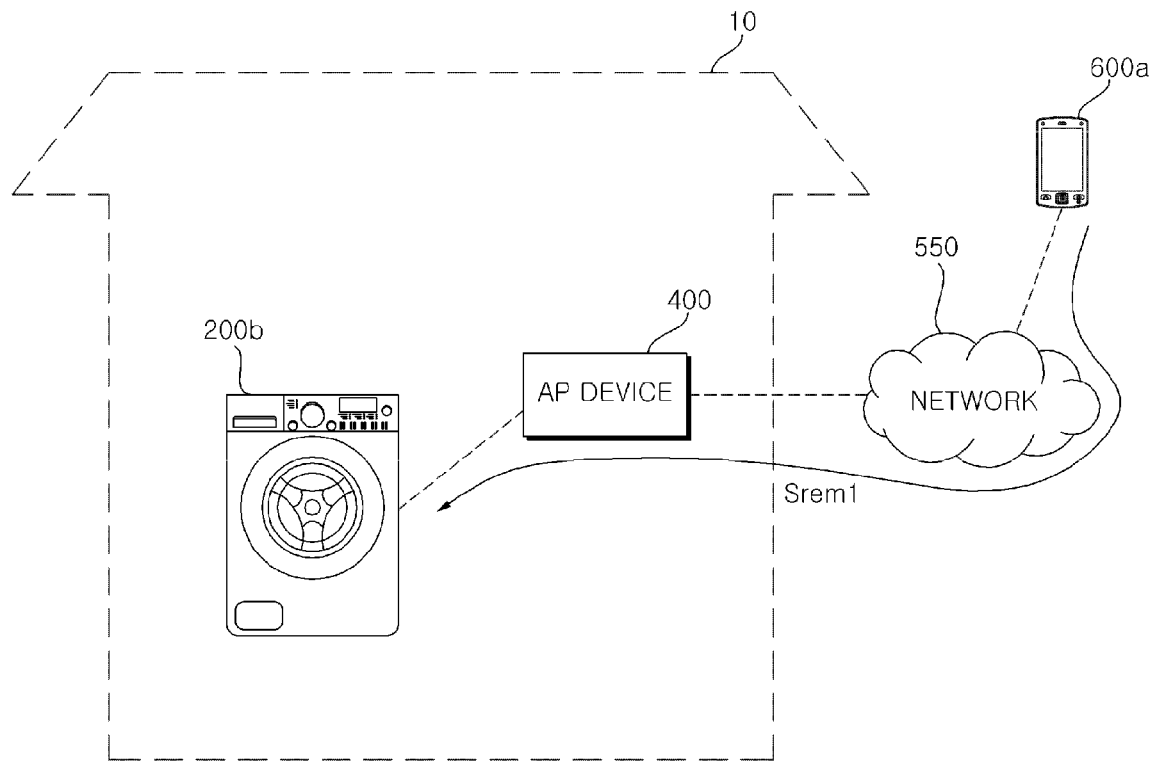

FIG. 14F illustrates that a remote control signal, Srem1, corresponding to the setting of FIG. 14E is transmitted to washing machine 200b via external network 550 and AP device 400.

Communication unit 222 of washing machine 200b receives the remote control signal, Srem1, which corresponds to washing for 10 minutes, rinsing twice, spin drying for 20 minutes, and a water temperature of 25° C., and transmits the received remote control signal to controller 270.

Controller 270 controls the motor to be driven based on the remote control signal, Srem1, such that washing machine 200b operates under the conditions of washing for 10 minutes, rinsing twice, spin drying for 20 minutes, and a water temperature of 25° C.

Figure 14G:
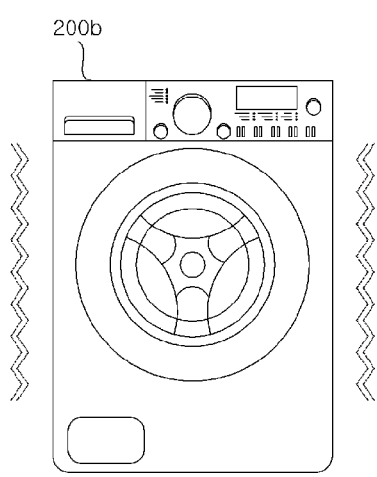

FIG. 14G illustrates that, upon reception of the remote control signal corresponding to the remotely controllable item, washing machine 200b performs a corresponding operation.

Meanwhile, upon determining at step S1125 that the mobile terminal is not located outside the house but in the house, step S1140 is performed.

That is, mobile terminal 600b receives a response signal from the home appliance (S1140). Subsequently, mobile terminal 600b displays a remote control screen (S1145).

Figure 15A:
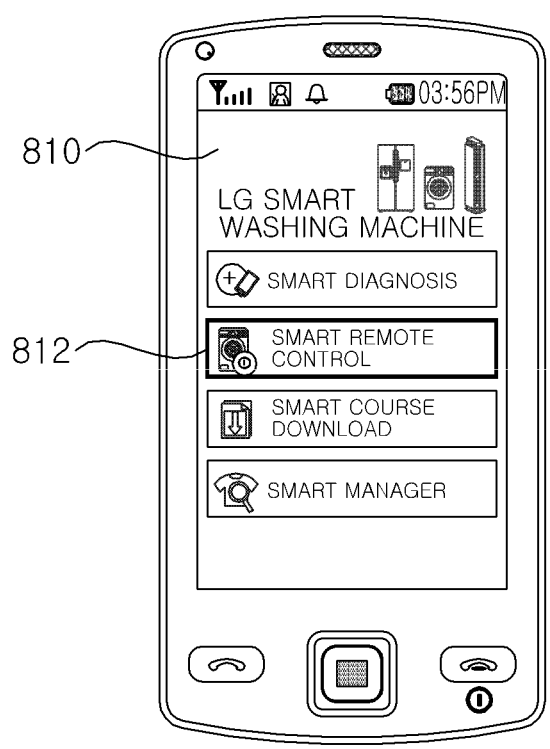

FIG. 15A illustrates that a home appliance-related application execution screen 810 is displayed on mobile terminal 600. In particular, FIG. 15A illustrates that a smart remote control item 812 in the home appliance-related application execution screen 810 is selected.

Figure 15B:
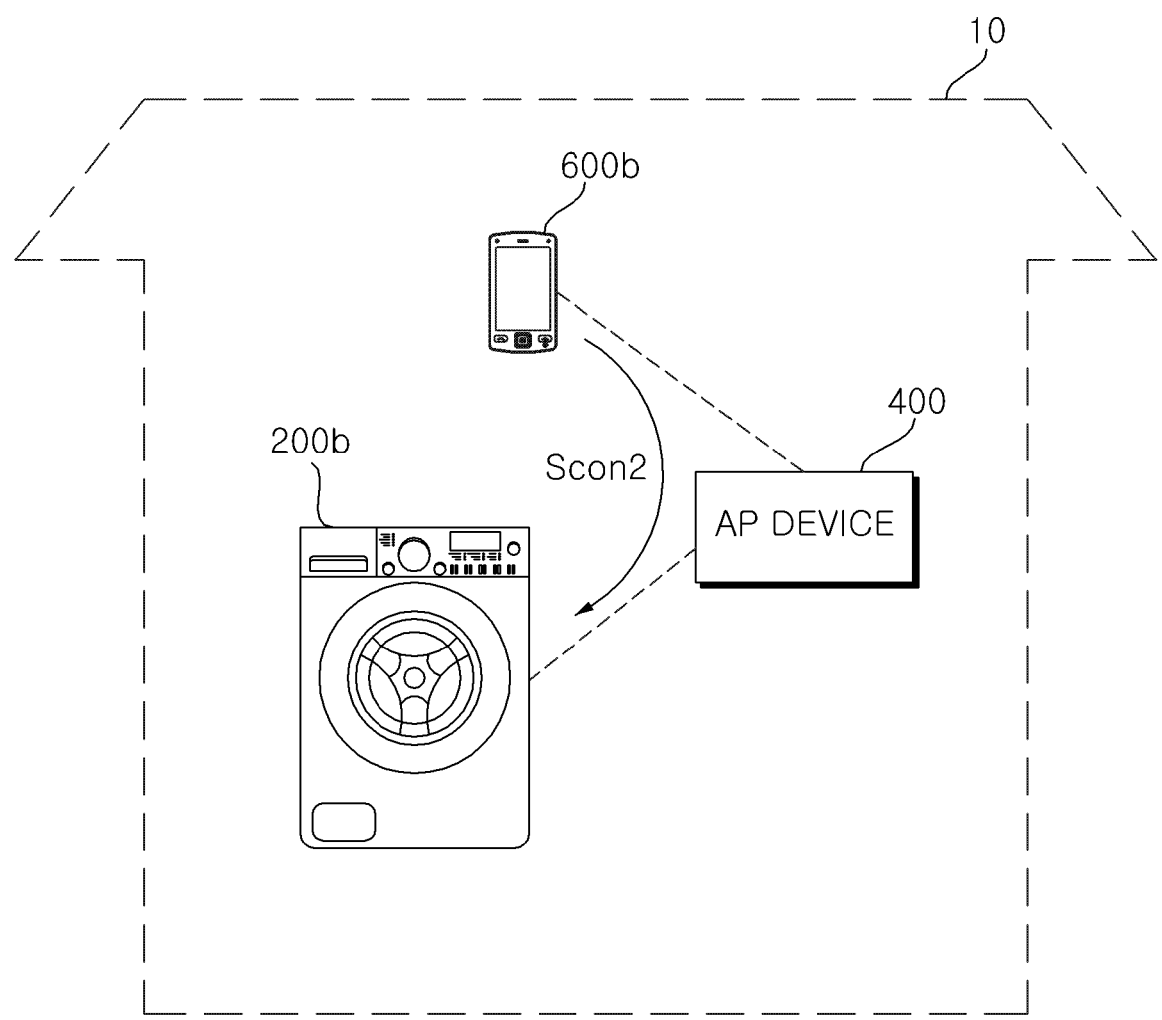

FIG. 15B illustrates that mobile terminal 600b is located in internal network 10. When a home appliance-related application is executed in mobile terminal 600b located in the house and the smart remote control item 812 is selected as shown in FIG. 15A, mobile terminal 600b may transmit a remote access signal, Scon2, to washing machine 200b via AP device 400 for remote control.

Figure 15C:
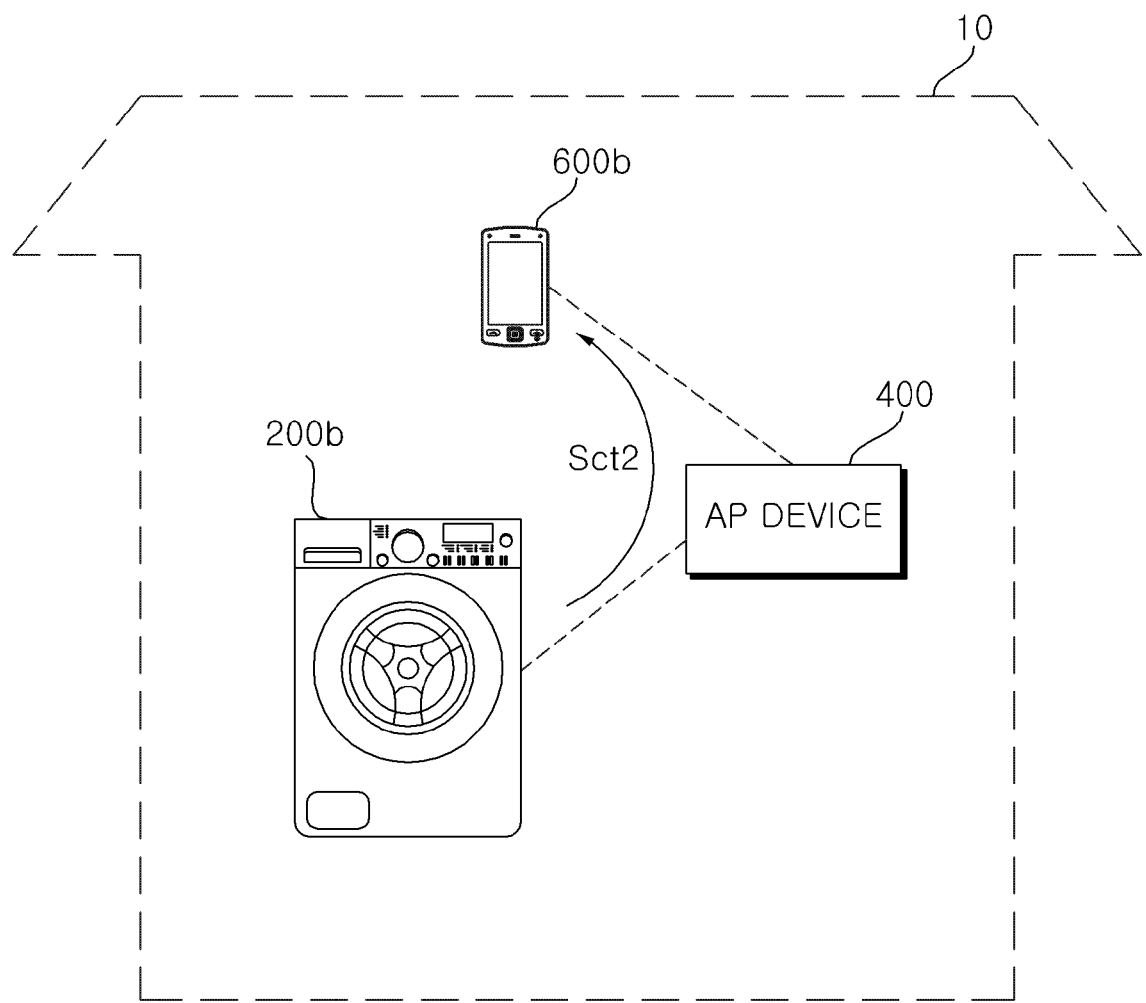

FIG. 15C illustrates that washing machine 200b transmits a notification, Sct2, including only a remotely controllable item to mobile terminal 600b located in the house.

On the other hand, such a notification may not be transmitted to mobile terminal 600b. In this case, mobile terminal 600b may display a remote control screen when mobile terminal 600b does not receive a message as to whether remote control is possible from washing machine 200b within a predetermined time.

Figure 15D:
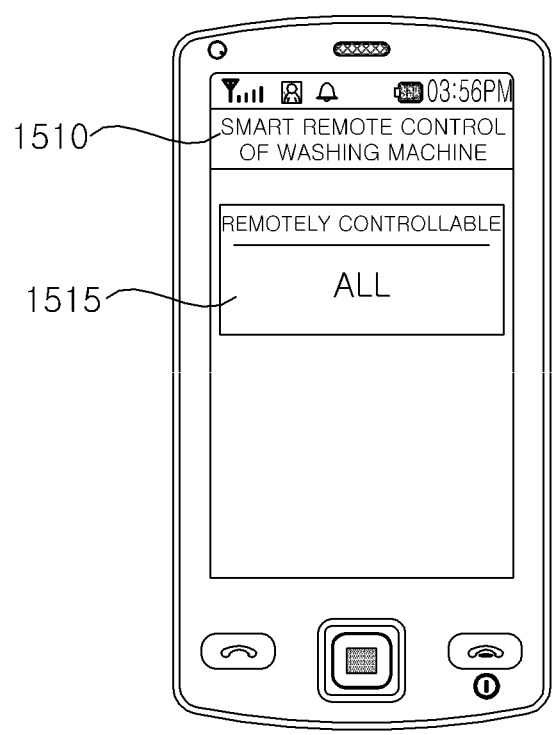

FIG. 15D illustrates that, when mobile terminal 600b is located in the house, mobile terminal 600b displays a remote control screen 1510 indicating that all items 1515 can be remotely controlled based on the notification, Sct2, received from washing machine 200b.

For example, "spin drying for 30 minutes or more," which is remotely uncontrollable in FIG. 14D, may be remotely controllable.

Figure 15E:
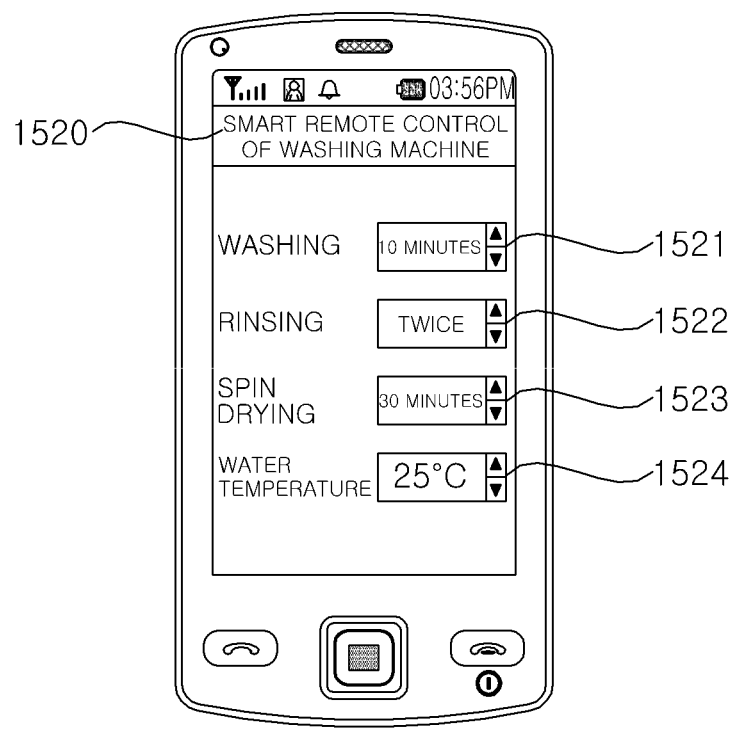

FIG. 15E illustrates a remote control screen 1520 that can be set by a user. The remote control screen 1520 may include a washing setting item 1521, a rinsing setting item 1522, a spin drying setting item 1523, and a water temperature setting item 1524.

FIG. 15E illustrates washing for 10 minutes, rinsing twice, spin drying for 30 minutes, and a water temperature of 25° C. However, various other examples may be given.

As compared with FIG. 14E, it can be seen that spin drying for 30 minutes is possible.

Figure 15F:
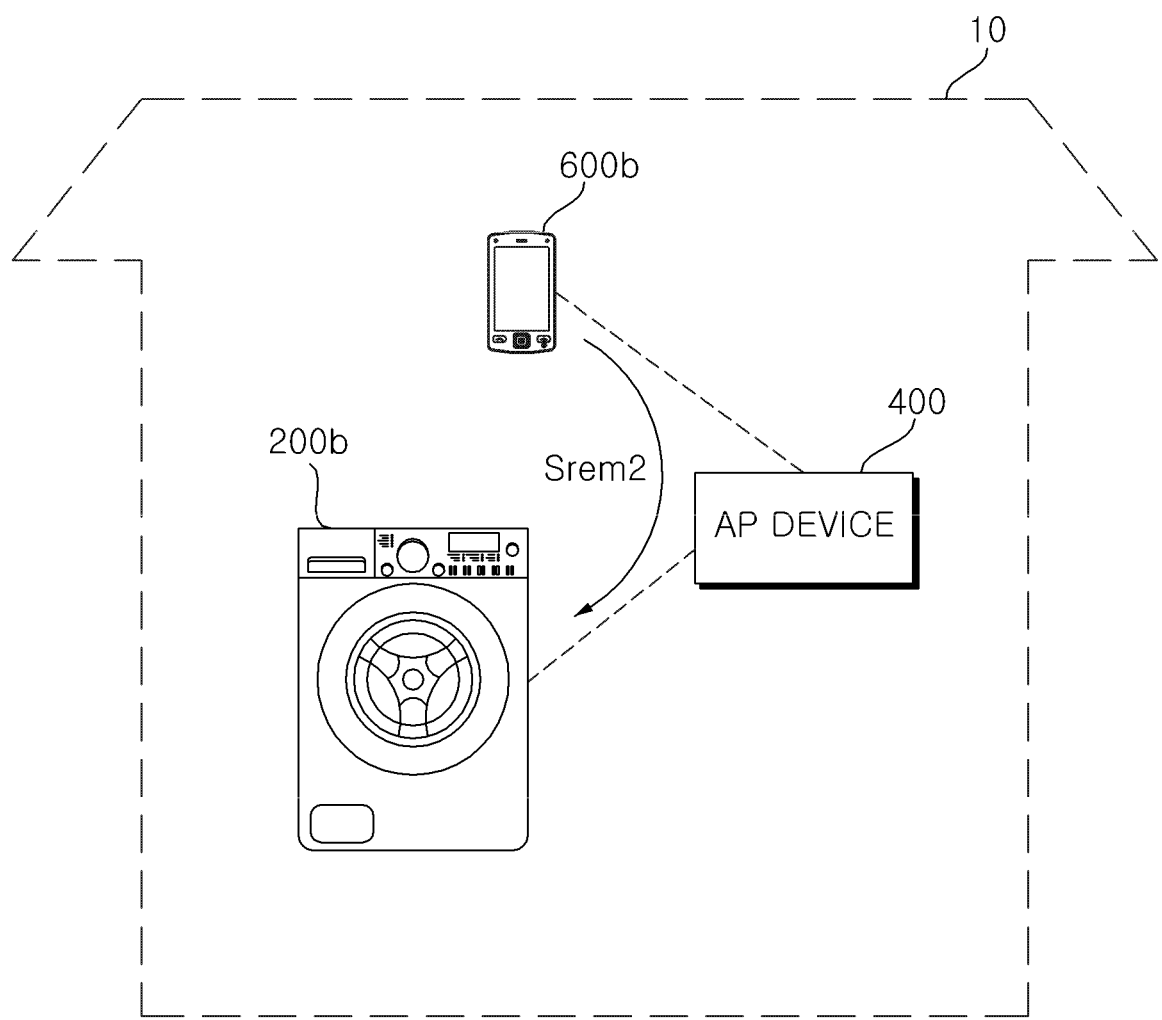

FIG. 15F illustrates that a remote control signal, Srem2, corresponding to the setting of FIG. 15E is transmitted to washing machine 200b via AP device 400.

Communication unit 222 of washing machine 200b receives the remote control signal, Srem2, which corresponds to washing for 10 minutes, rinsing twice, spin drying for 30 minutes, and a water temperature of 25° C., and transmits the received remote control signal to controller 270.

Controller 270 controls the motor to be driven based on the remote control signal, Srem2, such that washing machine 200b operates under the conditions of washing for 10 minutes, rinsing twice, spin drying for 30 minutes, and a water temperature of 25° C.

Figure 15G:
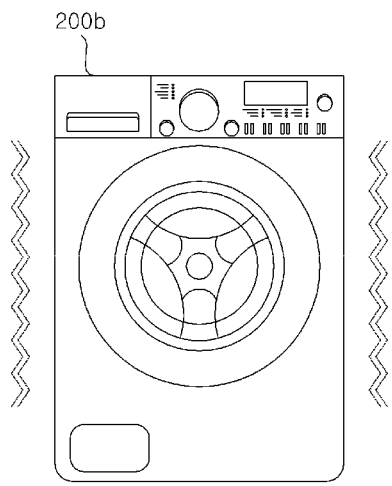

FIG. 15G illustrates that, upon reception of the remote control signal, washing machine 200b performs a corresponding operation.

Meanwhile, although the remotely controllable item and the remotely uncontrollable item are divided from each other at the time of remotely controlling washing machine 200b in the house and outside the house in FIGS. 14A to 15G, the same conditions may be applied even at the time of remotely controlling a variety of home appliances.

FIGS. 16A to 17G illustrate division into a remotely controllable item and a remotely uncontrollable item at the time of remotely controlling one of the home appliances, e.g. a cooking device 200d. in the house and outside the house.

Figure 16A:
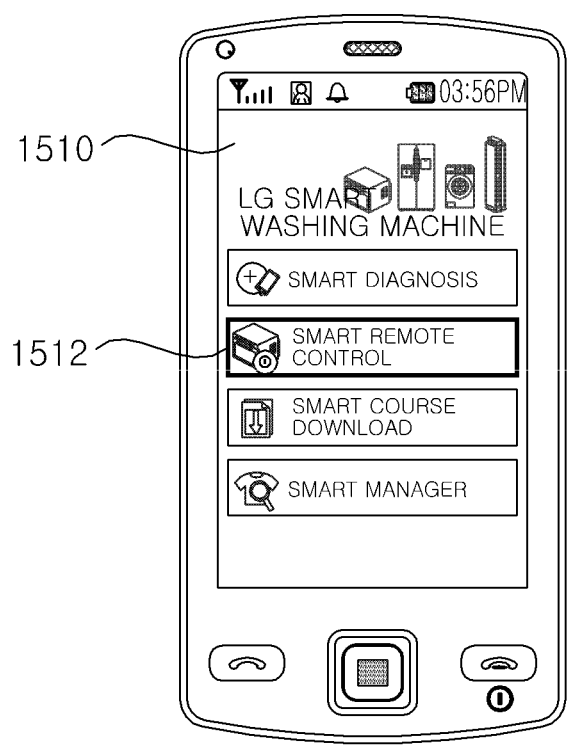

FIG. 16A illustrates that a home appliance-related application execution screen 1610 is displayed on mobile terminal 600. In particular, FIG. 16A illustrates that a smart remote control item 1612 in the home appliance-related application execution screen 1610 is selected.

Figure 16B:
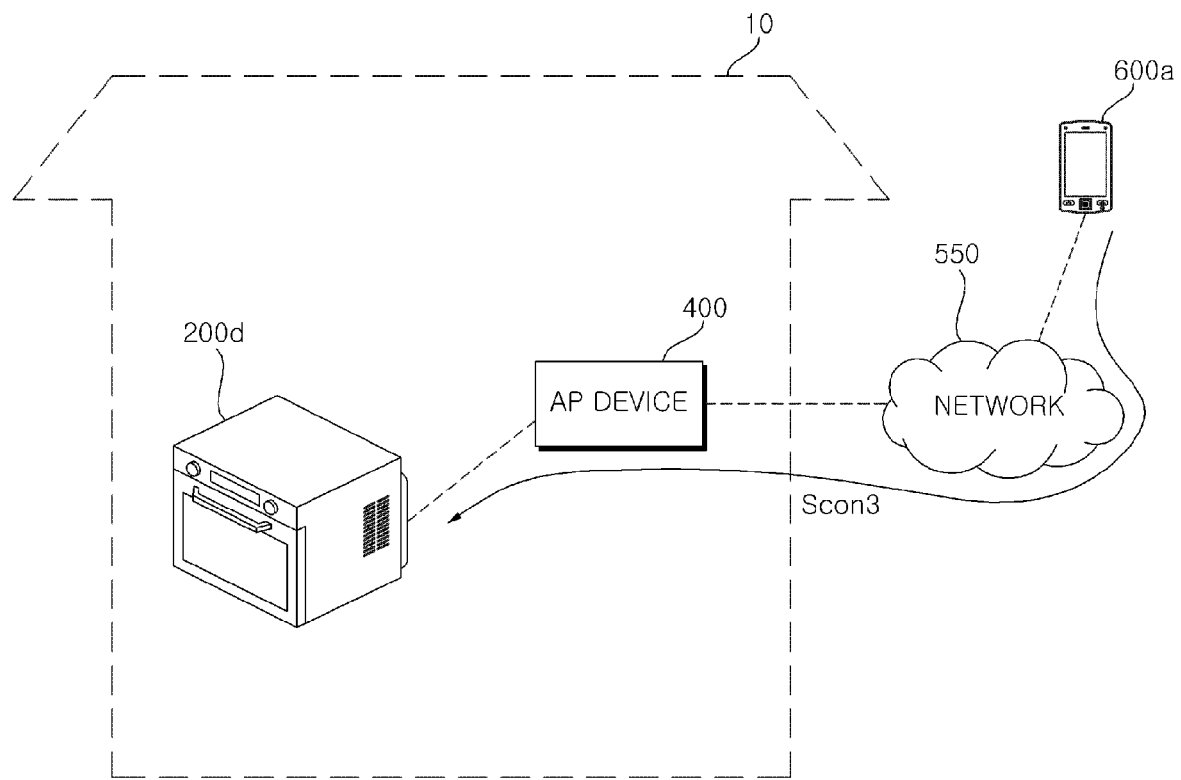

FIG. 16B illustrates that mobile terminal 600a is located outside internal network 10, i.e. outside the house. When a home appliance-related application is executed in mobile terminal 600a located outside the house and the smart remote control item 1612 is selected as shown in FIG. 16A, mobile terminal 600a may transmit a remote access signal, Scon3, to cooking device 200d via external network 550 and AP device 400 for remote control.

Figure 16C:
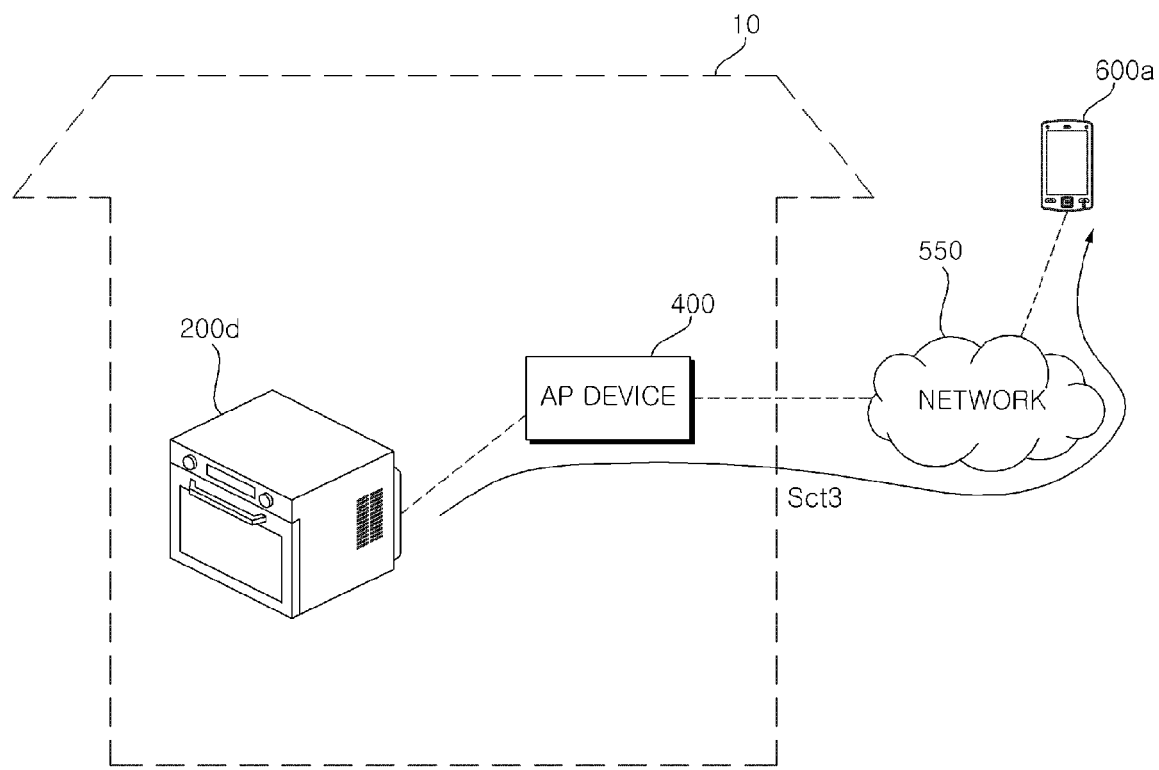

FIG. 16C illustrates that cooking device 200d transmits a notification, Sct3, including a remotely uncontrollable item and a remotely controllable item to mobile terminal 600a located outside the house.

Figure 16D:
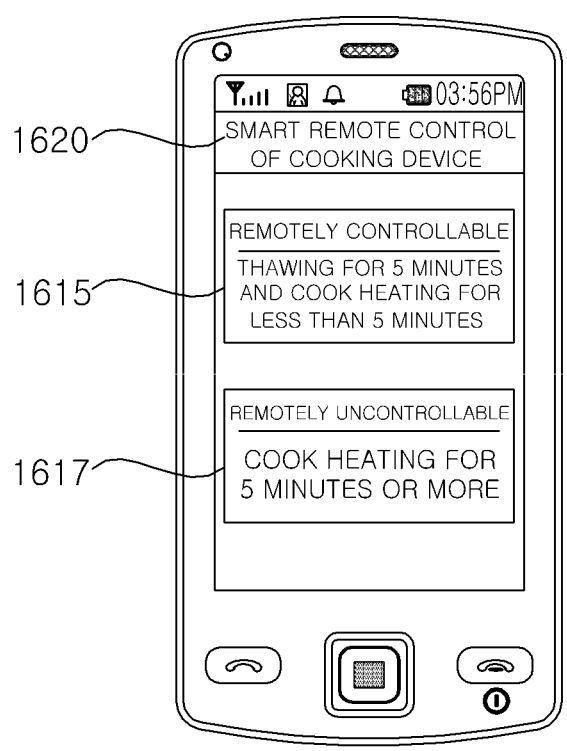

FIG. 16D illustrates that, when mobile terminal 600a is located outside the house, mobile terminal 600a displays a remote control screen 1620 including a remotely uncontrollable item 1617 and a remotely controllable item 1615 based on the notification, Sct3, received from cooking device 200d.

For example, the remotely controllable item 1615 may be "thawing for 5 minutes and cook heating for less than 5 minutes" as shown in FIG. 16D and the remotely uncontrollable item 1617 may be "cook heating for 5 minutes or more" as shown in FIG. 16D.

Figure 16E:
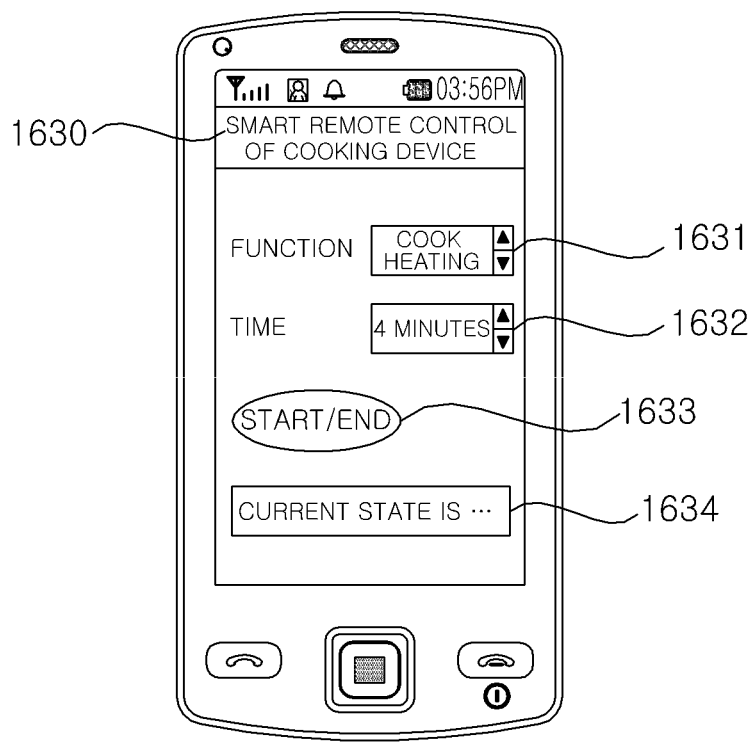

FIG. 16E illustrates a remote control screen 1630 that can be set by a user. Remote control screen 1630 may include a function setting item 1631, a time setting item 1632, a start/end setting item 1633, and a current state information display item 1634.

In a case in which "cook heating" is selected in the function setting item 1631, a cook heating time may not be set to 5 minutes or more in the time setting item 1632.

Meanwhile, in FIG. 16E, in a case in which the remotely uncontrollable item is selected, e.g. the cook heating time is set to 5 minutes or more, a message indicating remote uncontrollability may be displayed. As a result, user convenience may be improved.

Figure 16F:
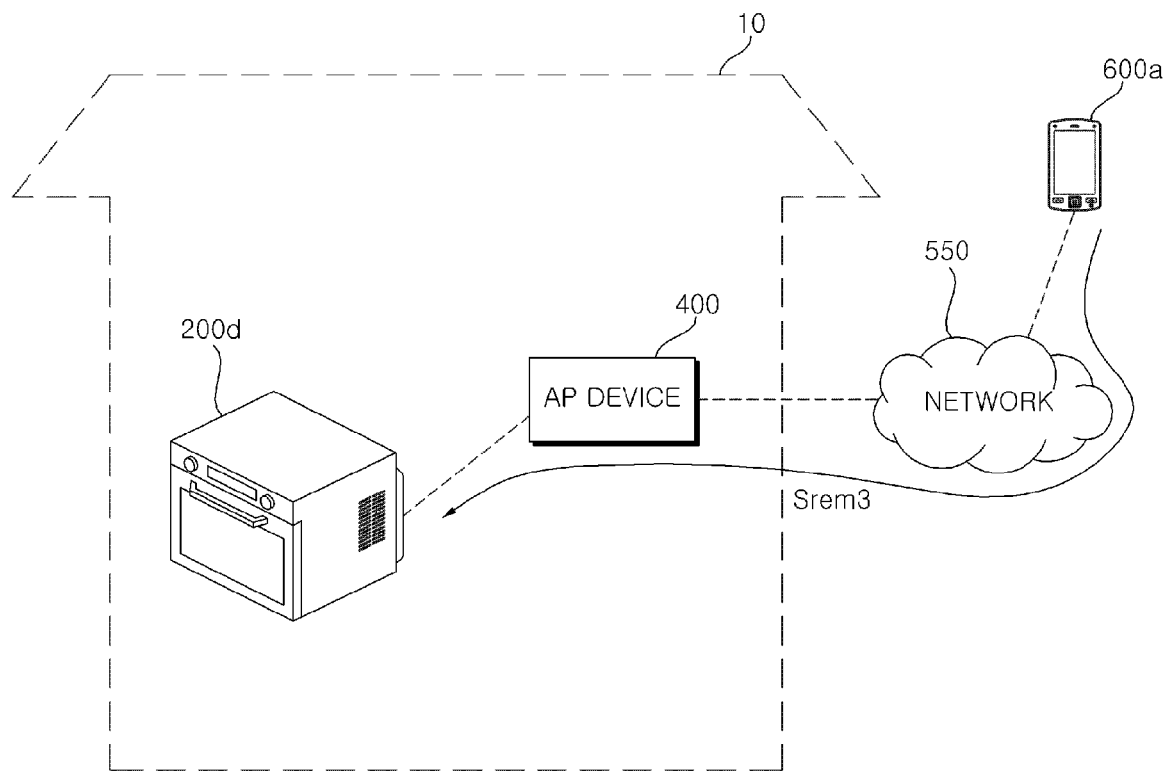

FIG. 16F illustrates that a remote control signal, Srem3, corresponding to the setting of FIG. 16E is transmitted to cooking device 200d via external network 550 and AP device 400.

Communication unit 222 of the cooking device 200d receives the remote control signal, Srem3, which corresponds to cook heating for 4 minutes, and transmits the received remote control signal to controller 270.

Controller 270 controls cooking device 200d to operate based on the remote control signal, Srem3, such that cooking device 200d operates under the condition of cook heating for 4 minutes.

Figure 16G:
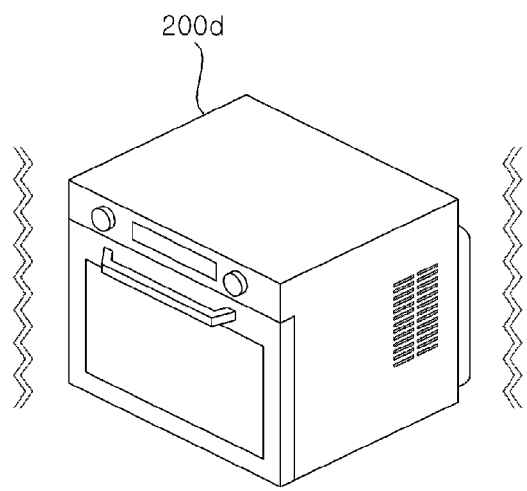

FIG. 16G illustrates that, upon reception of the remote control signal corresponding to the remotely controllable item, cooking device 200d performs a corresponding operation.

Figure 17A:
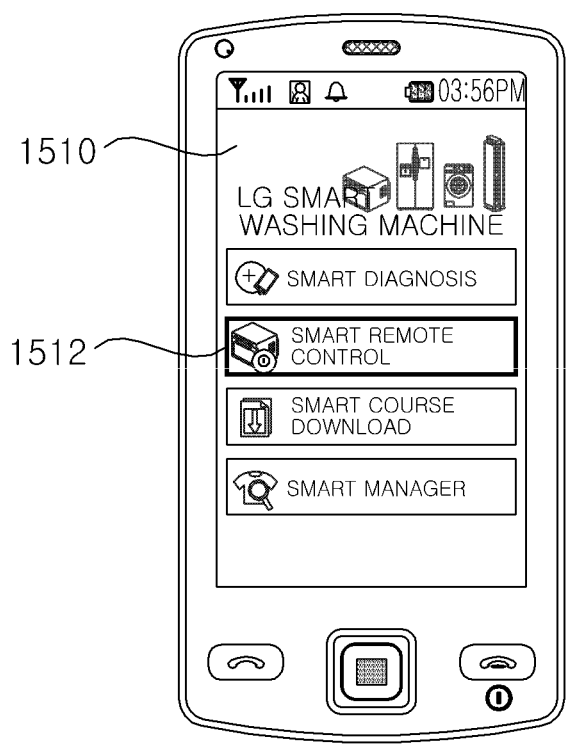

FIG. 17A is identical to FIG. 16A and thus a description thereof will be omitted.

Figure 17B:
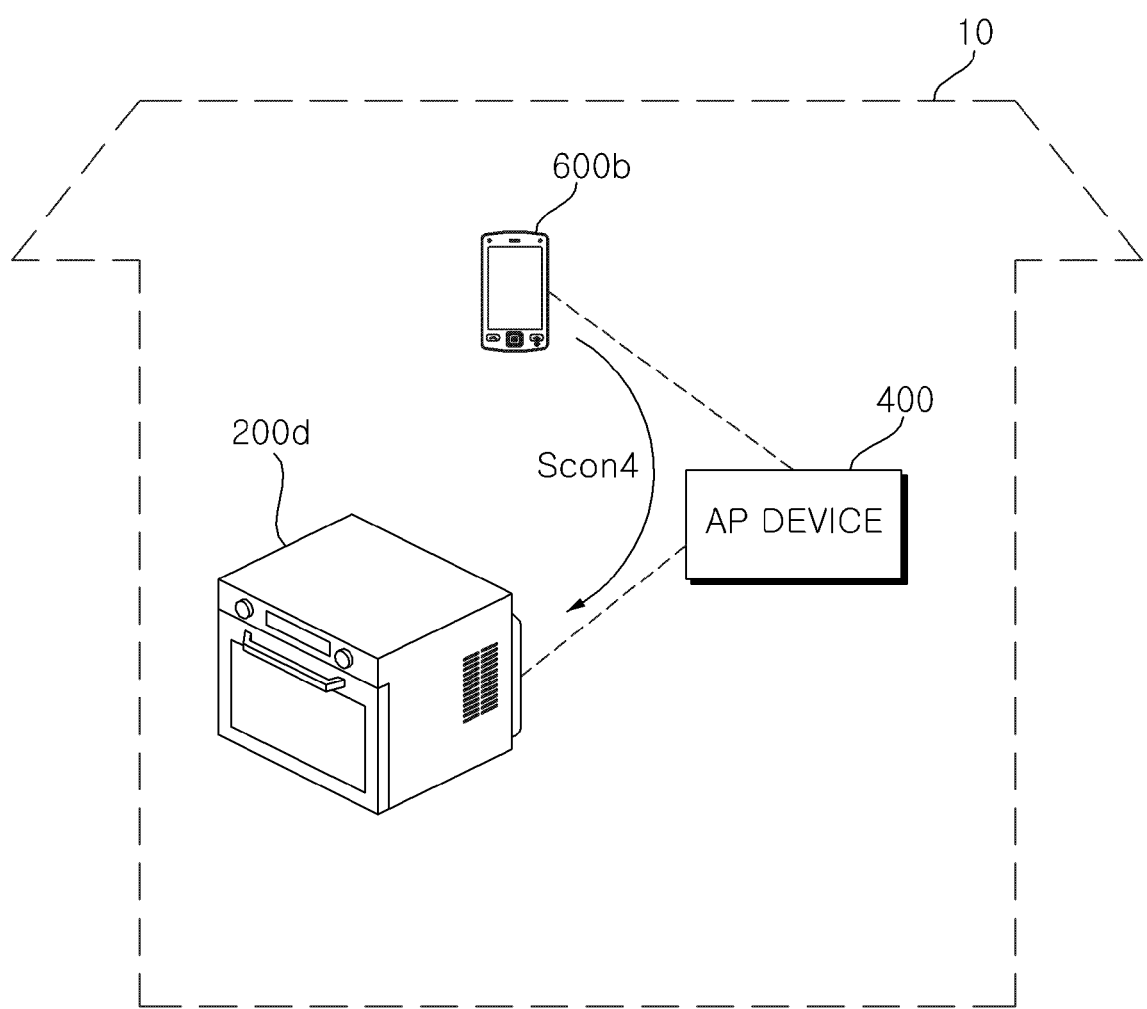

FIG. 17B illustrates that mobile terminal 600b is located in internal network 10. When a home appliance-related application is executed in mobile terminal 600b located in the house and the smart remote control item 1612 is selected as shown in FIG. 17A, mobile terminal 600b may transmit a remote access signal, Scon4, to cooking device 200d via AP device 400 for remote control.

Figure 17C:
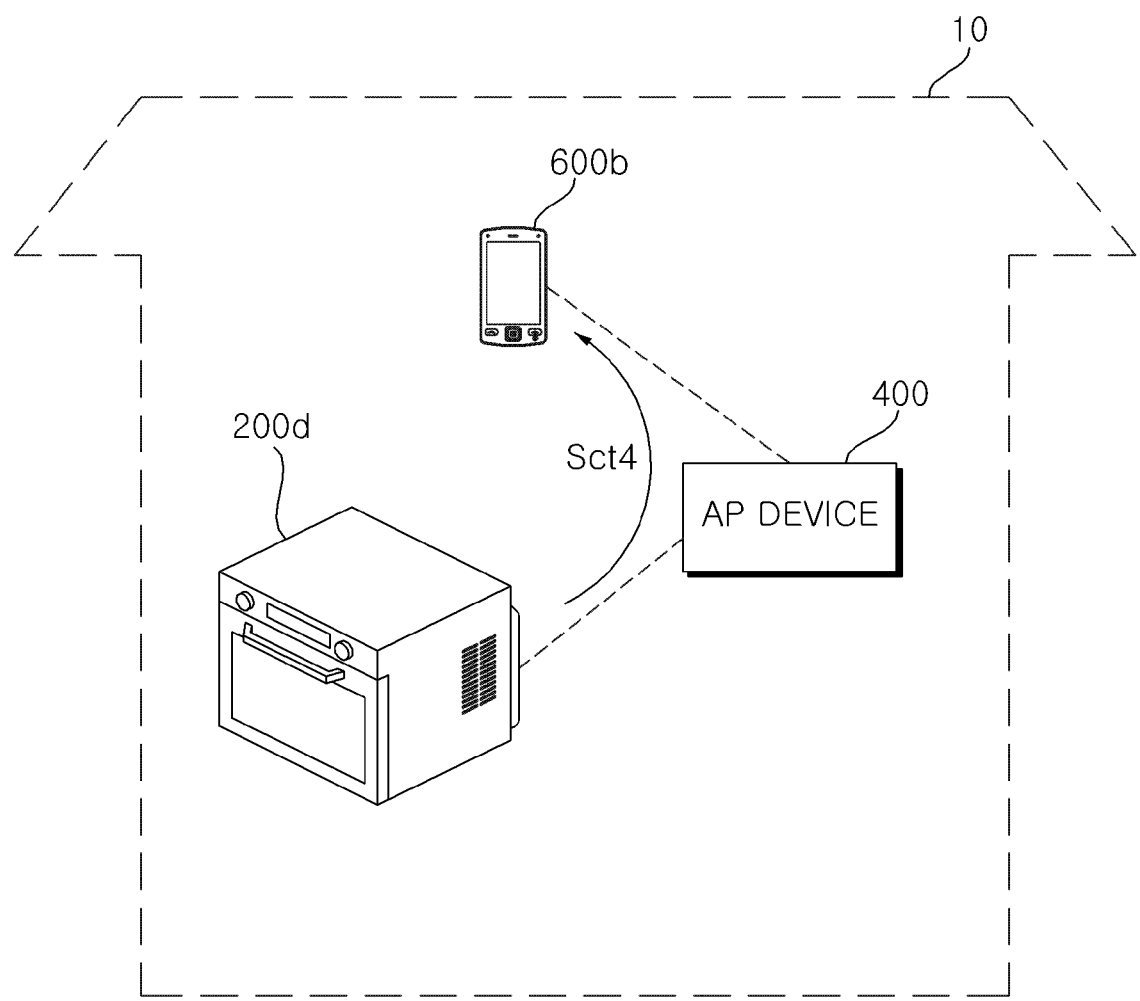

FIG. 17C illustrates that cooking device 200d transmits a notification, Sct4, including only a remotely controllable item to mobile terminal 600b located in the house.

On the other hand, such a notification may not be transmitted to mobile terminal 600b. In this case, mobile terminal 600b may display a remote control screen when mobile terminal 600b does not receive a message as to whether remote control is possible from cooking device 200d within a predetermined time.

Figure 17D:
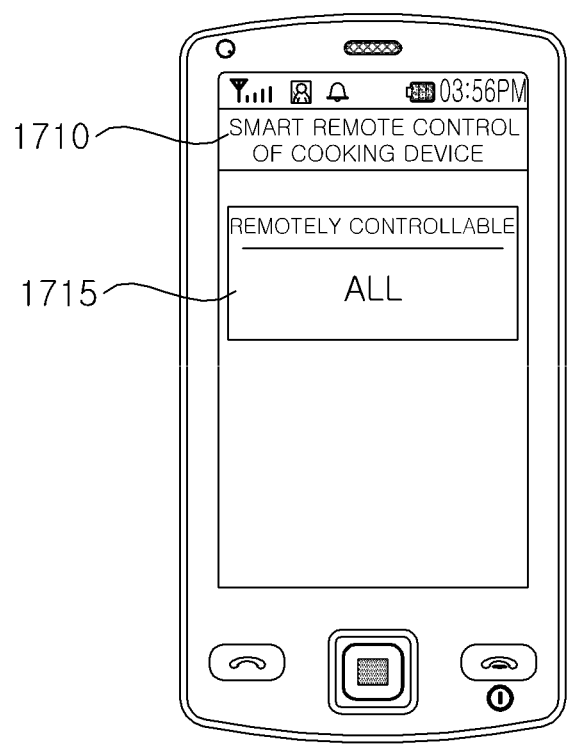

FIG. 17D illustrates that, when mobile terminal 600b is located in the house, mobile terminal 600b displays a remote control screen 1710 indicating that all items 1715 can be remotely controlled based on the notification, Sct4, received from cooking device 200d.

For example, "cook heating for 4 minutes or more," which is remotely uncontrollable in FIG. 16D, may be remotely controllable.

Figure 17E:
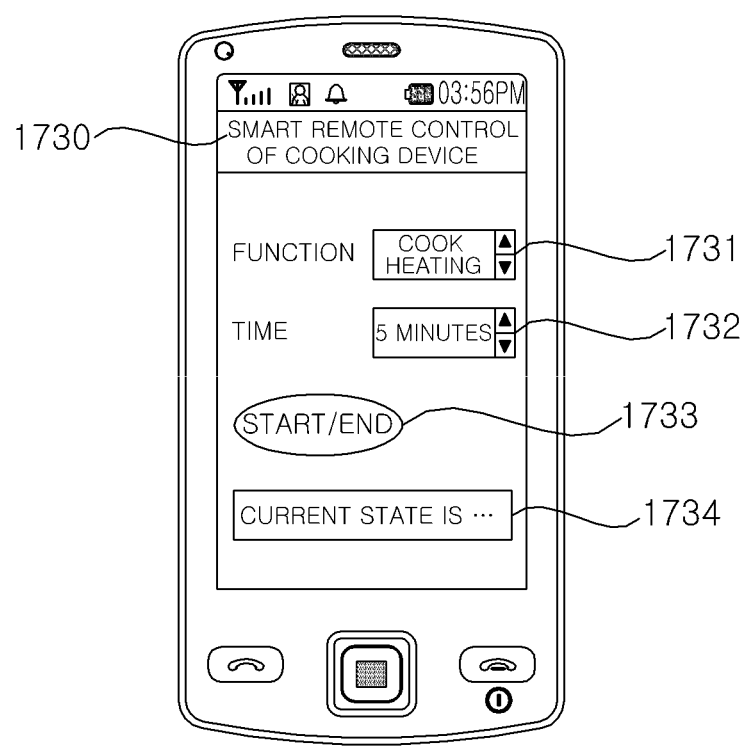

FIG. 17E illustrates a remote control screen 1730 that can be set by a user. Remote control screen 1730 may include a function setting item 1731, a time setting item 1732, a start/end setting item 1733, and a current state information display item 1734.

Although FIG. 17E illustrates cook heating for 5 minutes, various other examples may be given. Meanwhile, as compared with FIG. 16E, it can be seen that cook heating for 5 minutes is possible.

Figure 17F:
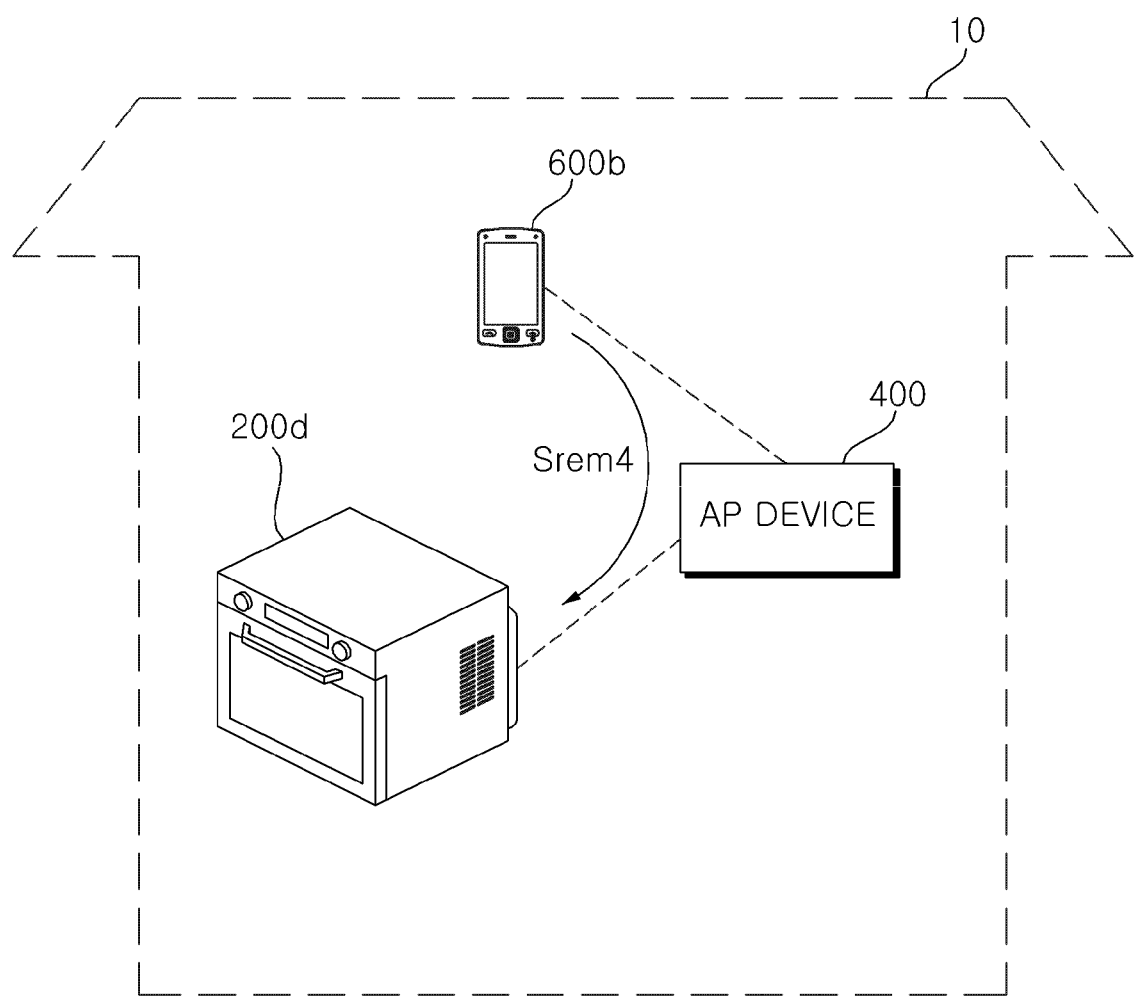

FIG. 17F illustrates that a remote control signal, Srem4, corresponding to the setting of FIG. 17E is transmitted to cooking device 200d via AP device 400.

Communication unit 222 of cooking device 200d receives the remote control signal, Srem4, which corresponds to cook heating for 5 minutes, and transmits the received remote control signal to controller 270.

Controller 270 controls drive unit 245 to be driven based on the remote control signal, Srem4, such that cooking device 200d operates under the condition of cook heating for 5 minutes.

Figure 17G:
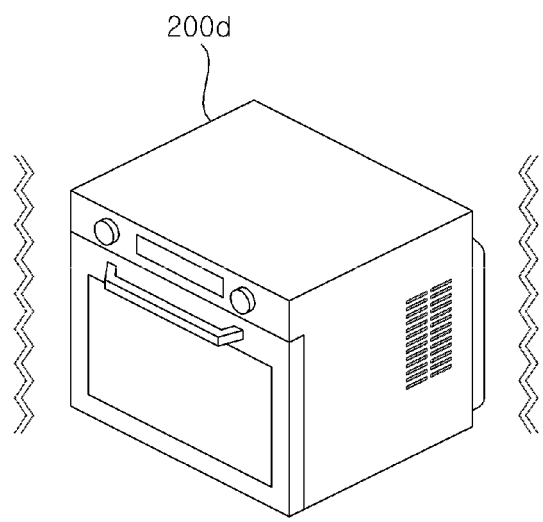

FIG. 17G illustrates that, upon reception of the remote control signal, cooking device 200d performs a corresponding operation.

The home appliance, the mobile terminal, and the operation method thereof according to the present invention are not limited to the constructions and methods of the embodiments as described above. For example, all or some of the embodiments may be selectively combined to achieve various modifications.

Meanwhile, the operation method of the home appliance according to embodiments of the present invention may be realized as code, which is readable by a processor included in the home appliance, in recording media readable by the processor. The recording media readable by the processor include all types of recording devices that store data readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that code readable by the processor is stored or executed in a distributed manner.

As is apparent from the above description, according to an embodiment of the present invention, in a case in when a time difference between the input of a local key and the reception of a remote control signal is within a predetermined time, a home appliance may assign priority to a user input signal according to the input of the local key and then operate. When a plurality of control rights is requested, therefore, the home appliance may assign priority to any one of the requested control rights. Particularly, when the time difference is within the predetermined time, the home appliance may assign priority to the input of the local key with the result that a local key user may have higher priority than a remote control user.

On the other hand, when the input of the local key is performed a predetermined time after the reception of the remote control signal, the home appliance may assign priority to the remote control signal. When a plurality of control rights is requested, therefore, the home appliance may assign priority to any one of the requested control rights.

Meanwhile, after priority is assigned to the user input signal according to the local key, a message of remote uncontrollability may be transmitted to a mobile terminal, thereby improving convenience in use of the remote control user through the mobile terminal.

On the other hand, after priority is assigned to the remote control signal, a message of remote uncontrollability may be transmitted to the mobile terminal, thereby improving convenience in use of the local key user.

According to another embodiment of the present invention, when a plurality of remote control signals is received from a plurality of mobile terminals, the home appliance may assign priority to the first one of the received remote control signals. When a plurality of control rights is requested, therefore, the home appliance may assign priority to any one of the requested control rights.

Meanwhile, a message of remote uncontrollability may be transmitted to the mobile terminal having transmitted the remote control signal to which priority has not been assigned, thereby improving convenience in use of the remote control user through the mobile terminal.

According to a further embodiment of the present invention, when remote access to the home appliance is performed through the mobile terminal, when the mobile terminal is located outside an internal network, a remotely controllable item and a remotely uncontrollable item may be received from the home appliance and displayed. Consequently, it is possible to provide different remote control rights to the mobile terminal in the house and the mobile terminal outside the house.

On the other hand, when the mobile terminal is located in the internal network, a remote control screen may be displayed without a remotely uncontrollable item. Consequently, it is possible to provide different remote control rights to the mobile terminal in the house and the mobile terminal outside the house.

During remote access to the home appliance, the mobile terminal may transmit network information of the mobile terminal to the home appliance and the home appliance may easily determine whether the mobile terminal is located in the internal network or outside the internal network based on the received network information of the mobile terminal.

In a case in which the mobile terminal is located outside the internal network, the home appliance may distinguishably notify the mobile terminal of the remotely controllable item and the remotely uncontrollable item such that the home appliance stably performs operation.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A home appliance comprising:
   a communication unit to receive a remote control signal from a mobile terminal;
   an input unit to receive a user input signal from a local key;
   a controller to, in a case in which a time difference between input of the local key and reception of the remote control signal is within a predetermined time, assign priority to the user input signal according to the input of the local key and control an operation corresponding to the user input signal to be performed; and
   a drive unit to drive the home appliance,
   wherein in a case in which remote control signals are received from a plurality of mobile terminals, the controller assigns priority to a first one of the received remote control signals and controls a message of remote controllability to be transmitted to the mobile terminal having transmitted the remote control signal to which the priority has not been assigned,
   wherein the controller controls the drive unit to perform an operation corresponding to the remote control signal to which the priority has been assigned, and
   wherein the communication unit transmits a message indicating that remote control is being performed with respect to the mobile terminal to which the priority has been assigned.

2. The home appliance according to claim 1, further comprising a drive unit to perform the operation corresponding to the user input signal.

3. The home appliance according to claim 1, further comprising a display unit to output a message indicating that the remote control signal has been received from the mobile terminal.

4. The home appliance according to claim 1, wherein, in a case in which the time difference between the input of the local key and the reception of the remote control signal exceeds the predetermined time, the controller assigns priority to the remote control signal and controls an operation corresponding to the remote control signal to be performed.

5. The home appliance according to claim 4, wherein the communication unit transmits a message of remote controllability to the mobile terminal after the priority is assigned to the remote control signal.

6. The home appliance according to claim 4, further comprising a display unit to output a message indicating that the operation according to the input of the local key cannot be performed after the priority is assigned to the remote control signal.

7. The home appliance according to claim 1, wherein the communication unit transmits at least one of information indicating that the remote control signals have been received and information related to the other mobile terminal to each mobile terminal.

8. An operation method of a home appliance comprising:
   receiving a remote control signal from a mobile terminal;
   receiving a user input signal from a local key;
   in a case in which a time difference between input of the local key and reception of the remote control signal is within a predetermined time,
      assigning priority to the user input signal according to input of the local key; and
      performing an operation corresponding to the user input signal,
   in a case in which remote control signals are received from a plurality of mobile terminals,
      assigning priority to a first one of the received remote control signals and controls a message of remote controllability to be transmitted to the mobile terminal having transmitted the remote control signal to which the priority has not been assigned,
      performing an operation corresponding to the remote control signal to which the priority has been assigned, and
      transmitting a message indicating that remote control is being performed with respect to the mobile terminal to which the priority has been assigned.

9. The operation method according to claim 8, further comprising transmitting a message of remote controllability to the mobile terminal after the priority is assigned to the user input signal.

10. The operation method according to claim 8, further comprising outputting a message indicating that the remote control signal has been received from the mobile terminal.

* * * * *